United States Patent
Anderson et al.

(10) Patent No.: US 8,972,066 B2
(45) Date of Patent: Mar. 3, 2015

(54) DECISION SUPPORT CONTROL CENTERS

(75) Inventors: Roger Anderson, New York, NY (US); Albert Boulanger, New York, NY (US); Philip Gross, New York, NY (US); Bob Blick, Bellerose, NY (US); Leon Bukhman, Brooklyn, NY (US); Mark Mastrocinque, East Northport, NY (US); John Johnson, Belle Harbor, NY (US); Fred Seibel, Santa Fe, NM (US); Hubert Delany, New Rochelle, NY (US)

(73) Assignees: The Trustees of Columbia University in the City of New York, New York, NY (US); Consolidated Edison Company of New York, New York, NY (US); Calm Energy, Inc., New York, NY (US)

( * ) Notice: Subject to any disclaimer, the term of this patent is extended or adjusted under 35 U.S.C. 154(b) by 1019 days.

(21) Appl. No.: 12/885,750

(22) Filed: Sep. 20, 2010

(65) Prior Publication Data
US 2011/0175750 A1    Jul. 21, 2011

Related U.S. Application Data

(63) Continuation of application No. PCT/US2009/037995, filed on Mar. 23, 2009.

(60) Provisional application No. 61/038,650, filed on Mar. 21, 2008.

(51) Int. Cl.
G05D 5/00    (2006.01)
G01D 4/00    (2006.01)

(52) U.S. Cl.
CPC .............. *G01D 4/004* (2013.01); *Y02B 90/242* (2013.01); *Y02B 90/245* (2013.01); *Y04S 20/322* (2013.01); *Y04S 20/40* (2013.01)
USPC ...................................... 700/286; 340/870.02

(58) Field of Classification Search
CPC ....................................................... H02J 13/00
USPC ............ 340/870.02–870.03, 870.16; 700/286
See application file for complete search history.

(56) References Cited

U.S. PATENT DOCUMENTS

| | | |
|---|---|---|
| 5,225,712 A | 7/1993 | Erdman |
| 5,625,751 A | 4/1997 | Brandwajn et al. |
| 5,764,155 A | 6/1998 | Kertesz et al. |
| 5,862,391 A | 1/1999 | Salas et al. |
| 5,875,431 A | 2/1999 | Heckman et al. |

(Continued)

FOREIGN PATENT DOCUMENTS

| | | |
|---|---|---|
| EP | 2 377 217 | 10/2011 |
| WO | WO/93/03401 | 2/1993 |

(Continued)

OTHER PUBLICATIONS

U.S. Appl. No. 13/742,124, filed Jan. 15, 2013.

(Continued)

*Primary Examiner* — Albert Wong
(74) *Attorney, Agent, or Firm* — Baker Botts L.L.P.

(57) ABSTRACT

The disclosed subject matter relates to an integrated decision support "cockpit" or control center for displaying, analyzing, and/or responding to, various events and contingencies that can occur within an electrical grid.

25 Claims, 9 Drawing Sheets

(56) References Cited

U.S. PATENT DOCUMENTS

| | | | |
|---|---|---|---|
| 5,893,069 A | 4/1999 | White et al. |
| 5,959,547 A | 9/1999 | Tubel et al. |
| 5,963,457 A | 10/1999 | Kano et al. |
| 6,012,016 A | 1/2000 | Bilden et al. |
| 6,055,517 A | 4/2000 | Friend et al. |
| 6,125,044 A | 9/2000 | Cherniski et al. |
| 6,125,453 A | 9/2000 | Wyss |
| 6,154,731 A | 11/2000 | Monk et al. |
| 6,169,981 B1 | 1/2001 | Werbos |
| 6,219,650 B1 | 4/2001 | Friend et al. |
| 6,266,619 B1 | 7/2001 | Thomas et al. |
| 6,308,162 B1 | 10/2001 | Ouimet et al. |
| 6,311,144 B1 | 10/2001 | Abu El Ata |
| 6,321,205 B1 | 11/2001 | Eder |
| 6,434,435 B1 | 8/2002 | Tubel et al. |
| 6,519,568 B1 | 2/2003 | Harvey et al. |
| 6,581,045 B1 | 6/2003 | Watson |
| 6,629,044 B1 | 9/2003 | Papallo, Jr. et al. |
| 6,772,211 B2 | 8/2004 | Lu et al. |
| 6,807,537 B1 | 10/2004 | Thiesson et al. |
| 6,826,483 B1 | 11/2004 | Anderson et al. |
| 6,829,384 B2 | 12/2004 | Schneiderman et al. |
| 6,944,678 B2 | 9/2005 | Lu et al. |
| 6,963,793 B2 | 11/2005 | Yamada et al. |
| 7,106,045 B2 | 9/2006 | Jungwirth et al. |
| 7,127,584 B1 | 10/2006 | Thompson et al. |
| 7,130,832 B2 | 10/2006 | Bannai et al. |
| 7,132,623 B2 | 11/2006 | De Miranda et al. |
| 7,233,843 B2 | 6/2007 | Budhraja et al. |
| 7,236,953 B1 | 6/2007 | Cooper et al. |
| 7,243,081 B2 | 7/2007 | Friend et al. |
| 7,274,975 B2 | 9/2007 | Miller |
| 7,369,950 B2 | 5/2008 | Wall et al. |
| 7,395,252 B2 | 7/2008 | Anderson et al. |
| 7,467,119 B2 | 12/2008 | Saidi et al. |
| 7,519,506 B2 | 4/2009 | Trias |
| 7,555,454 B2 | 6/2009 | Cooper et al. |
| 7,590,472 B2 | 9/2009 | Hakim et al. |
| 7,873,567 B2 | 1/2011 | Eder |
| 7,925,557 B1 | 4/2011 | Ficery et al. |
| 7,945,524 B2 | 5/2011 | Anderson et al. |
| 8,036,996 B2 | 10/2011 | Long et al. |
| 8,116,915 B2 | 2/2012 | Kempton |
| 8,305,737 B2 | 11/2012 | Ewing et al. |
| 2001/0049651 A1 | 12/2001 | Selleck |
| 2002/0001307 A1 | 1/2002 | Nguyen et al. |
| 2002/0084655 A1 | 7/2002 | Lof et al. |
| 2002/0087234 A1 | 7/2002 | Lof et al. |
| 2002/0198627 A1 | 12/2002 | Nasman et al. |
| 2003/0130755 A1 | 7/2003 | Bazzocchi et al. |
| 2003/0171851 A1 | 9/2003 | Brickfield et al. |
| 2003/0188208 A1 | 10/2003 | Fung |
| 2004/0010582 A1 | 1/2004 | Oliver |
| 2004/0143477 A1 | 7/2004 | Wolff |
| 2004/0158417 A1 | 8/2004 | Bonet |
| 2004/0158772 A1 | 8/2004 | Pan et al. |
| 2004/0163895 A1 | 8/2004 | Kostka et al. |
| 2004/0267395 A1 | 12/2004 | Discenzo et al. |
| 2005/0033481 A1 | 2/2005 | Budhraja et al. |
| 2005/0033707 A1 | 2/2005 | Ehlers et al. |
| 2005/0034023 A1 | 2/2005 | Maturana et al. |
| 2005/0207081 A1 | 9/2005 | Ying |
| 2006/0106797 A1 | 5/2006 | Srinivasa et al. |
| 2006/0111860 A1 | 5/2006 | Trias |
| 2006/0168398 A1 | 7/2006 | Cadaret |
| 2006/0185756 A1 | 8/2006 | Sato et al. |
| 2006/0200400 A1 | 9/2006 | Hunter et al. |
| 2006/0259199 A1 | 11/2006 | Gjerde et al. |
| 2006/0288260 A1 | 12/2006 | Xiao et al. |
| 2007/0094187 A1 | 4/2007 | Anderson et al. |
| 2007/0177508 A1 | 8/2007 | Croak et al. |
| 2007/0192078 A1 | 8/2007 | Nasle et al. |
| 2007/0198108 A1 | 8/2007 | Nair et al. |
| 2007/0228843 A1 | 10/2007 | Radley |
| 2007/0271006 A1 | 11/2007 | Golden et al. |
| 2008/0039980 A1 | 2/2008 | Pollack et al. |
| 2008/0109205 A1 | 5/2008 | Nasle |
| 2008/0126171 A1 | 5/2008 | Baldwin et al. |
| 2008/0167756 A1 | 7/2008 | Golden et al. |
| 2008/0177678 A1 | 7/2008 | Di Martini et al. |
| 2008/0183339 A1 | 7/2008 | Vaswani et al. |
| 2008/0250265 A1 | 10/2008 | Chang et al. |
| 2008/0281663 A1 | 11/2008 | Hakim et al. |
| 2008/0294387 A1 | 11/2008 | Anderson et al. |
| 2008/0313006 A1 | 12/2008 | Witter et al. |
| 2008/0319923 A1 | 12/2008 | Casey et al. |
| 2009/0031241 A1 | 1/2009 | Castelli et al. |
| 2009/0063094 A1 | 3/2009 | Havener et al. |
| 2009/0063122 A1 | 3/2009 | Nasle |
| 2009/0076749 A1 | 3/2009 | Nasle |
| 2009/0113049 A1 | 4/2009 | Nasle et al. |
| 2009/0157573 A1 | 6/2009 | Anderson et al. |
| 2009/0178089 A1 | 7/2009 | Picco et al. |
| 2009/0187285 A1 | 7/2009 | Yaney et al. |
| 2009/0210081 A1 | 8/2009 | Sustaeta et al. |
| 2009/0240380 A1 | 9/2009 | Shah et al. |
| 2010/0106641 A1 | 4/2010 | Chassin et al. |
| 2010/0107173 A1 | 4/2010 | Chassin |
| 2010/0114387 A1 | 5/2010 | Chassin |
| 2010/0169226 A1 | 7/2010 | Lymbery et al. |
| 2010/0185557 A1 | 7/2010 | Hunter et al. |
| 2010/0207728 A1 | 8/2010 | Roscoe et al. |
| 2010/0306014 A1 | 12/2010 | Chow |
| 2010/0332373 A1 | 12/2010 | Crabtree et al. |
| 2011/0172973 A1 | 7/2011 | Richards et al. |
| 2011/0231028 A1 | 9/2011 | Ozog |
| 2011/0231213 A1 | 9/2011 | Anderson et al. |
| 2011/0264276 A1 | 10/2011 | Kressner et al. |
| 2011/0270486 A1 | 11/2011 | Stevens et al. |
| 2011/0282703 A1 | 11/2011 | Chow et al. |
| 2012/0005131 A1 | 1/2012 | Horvitz et al. |
| 2012/0005490 A1 | 1/2012 | Goraczko et al. |
| 2012/0029677 A1 | 2/2012 | Havener et al. |
| 2012/0072039 A1 | 3/2012 | Anderson et al. |
| 2012/0101648 A1 | 4/2012 | Federspiel et al. |
| 2012/0146799 A1 | 6/2012 | Bell et al. |
| 2012/0150707 A1 | 6/2012 | Campbell et al. |
| 2012/0158633 A1 | 6/2012 | Eder |
| 2012/0197558 A1 | 8/2012 | Henig et al. |
| 2012/0200423 A1 | 8/2012 | DiLuciano et al. |
| 2012/0203380 A1 | 8/2012 | Scelzi et al. |
| 2012/0240072 A1 | 9/2012 | Altamura et al. |
| 2012/0263376 A1 | 10/2012 | Wang et al. |
| 2012/0278051 A1 | 11/2012 | Jiang et al. |
| 2012/0278129 A1 | 11/2012 | Salomatin et al. |
| 2013/0073488 A1 | 3/2013 | Anderson et al. |
| 2013/0080205 A1 | 3/2013 | Anderson et al. |
| 2013/0158725 A1 | 6/2013 | Anderson et al. |
| 2013/0232094 A1 | 9/2013 | Anderson et al. |
| 2014/0163759 A1 | 6/2014 | Anderson et al. |
| 2014/0249876 A1 | 9/2014 | Anderson et al. |

FOREIGN PATENT DOCUMENTS

| | | |
|---|---|---|
| WO | WO/2007/087537 | 2/2007 |
| WO | WO/2007/136456 | 11/2007 |

OTHER PUBLICATIONS

U.S. Appl. No. 13/589,737, Jun. 5, 2013 Non-Final Office Action.
U.S. Appl. No. 12/019,347, Jun. 26, 2013 Notice of Allowance.
U.S. Appl. No. 12/777,803, Jul. 8, 2013 Notice of Allowance.
U.S. Appl. No. 12/778,803, Jun. 17, 2013 Response to Non-Final Office Action.
Lundgren, "Implementing Service model Visualizations: Utilizing Hyperbolic Tree Structures for Visualizing Service Models in Telecommunication Networks", *Institutionen for Informatik*, 30 pages (2009).
U.S. Appl. No. 13/214,057, Sep. 18, 2013 Restriction Requirement.
U.S. Appl. No. 12/885,800, Jul. 18, 2013, Amendment and Request for Continued Examination (RCE).
U.S. Appl. No. 13/589,737, Aug. 29, 2013 Repsonse to Non-Final Office Action.

(56) References Cited

OTHER PUBLICATIONS

U.S. Appl. No. 13/646,939, Sep. 6, 2013 Final Office Action.
U.S. Appl. No. 13/646,939, Aug. 2, 2013 Response to Non-Final Office Action.
U.S. Appl. No. 12/909,022, Aug. 15, 2013 Final Office Action.
U.S. Appl. No. 12/909,022, Aug. 6, 2013 Response to Non-Final Office Action.
U.S. Appl. No. 12/019,347, Sep. 11, 2013 Issue Fee payment.
U.S. Appl. No. 13/742,124, Sep. 20, 2013 Non-Final Office Action.
Becker, et al., "Real-time Ranking with Concept Drift Using Expert Advice", *Proceedings of the 13th ACM SIGKDD International Conference on Knowledge Discovery and Data Mining*,ACM, pp. 86-94 (2007).
Dutta, et al., "Estimating the Time Between Failures of Electrical Feeders in the New York Power Grid", *Next Generation Data Mining Summit*, NGDM, 5 pages (2009).
Gross, et al., "Ranking Electrical Feeders of the New York Power Grid", *2009 International Conference on Machine Learning and Application*, pp. 1-7 (2009).
Gross, et al., "Predicting Electricity Distribution Feeder Failures Using Machine Learning Susceptibility Analysis", *Proceedings of the National Conference on Artificial Intelligence*, 21(2):1-7 (2005).
Radeva, et al., "Report Cards for Manholes: Eleciting Expert Feedback for a Learning Task", *2009 International Conference on Machine Learning and Applications*, pp:1-6 (2009).
Rudin et al. "Predicting vulnerability to serious manhole events in Manhattan: A preliminary machine learning approach", *Machine Learning Manuscript* No. 80.1; pp. 1-31 (Jan. 28, 2010).
Rudin, et al., "A process for predicting manhole events in Manhattan", *IEEE Transactions on Pattern Analysis and Machine Intelligence*, 80(1):1-21 (Jul. 2010).
Rudin, et al., "A process for predicting manhole events in Manhattan", *Machine Learning*, 80(1):1-31 (Jan. 28, 2010).
U.S. Appl. No. 14/137,381, filed Dec. 20, 2013.
U.S. Appl. No. 13/214,057, Jan. 2, 2014 Non-Final Office Action.
U.S. Appl. No. 13/742,124, Dec. 27, 2013 Interview Summary.
U.S. Appl. No. 13/742,124, Dec. 20, 2013 Response to Non-Final Office Action.
U.S. Appl. No. 13/646,939, Jan. 7, 2014 Notice of Allowance.
U.S. Appl. No. 13/589,737, Dec. 27, 2013 Amendment and Request for Continued Examination (RCE).
Chen, et al., "Particle Swarm Optimization for Next Generation Smart Grid Outage Analyses", *IEEE Transmission and Distribution Conference and Exposition*, pp. 1-6 (2012).
Choi, et al., "The Design of Outage Management System Utilizing Meter Information Based on AMI (Advanced Metering Infrastructure) system", *IEEE, 8th International Conference on Power Electronics—ECCE Asia*, pp. 2955-2961 (May 30-Jun. 30, 2011).
Russell, et al., "Intelligent Systems for Improved Reliability and Failure Diagnosis in Distribution Systems", *IEEE Transactions on Smart Grid*, 1(1):48-56 (2010).
Zhu, et al., "Lassoing Line Outages on the Smart Power Grid", *IEEE International Conference of Smart Grid Communications*, pp. 570-575 (2011).
U.S. Appl. No. 12/885,800, Feb. 21, 2013 Final Office Action.
International Search Report and Written Opinion for PCT/US2012/056321, dated Dec. 7, 2012.
Doukas, et al., "Intelligent Building Energy Management System Using Rule Sets", *Building and Environment*, 42:3562-3569 (2007) [online]. Retrieved Oct. 29, 2012 from URL:<http://www.aseanbiotechnology.info/Abstract/21024252.pdf>.
Ma, "Online Supervisory and Optimal Control of Complex Building Central Chilling Systems", [online], dated Apr. 2008. Retrieved on Oct. 29, 2012 from URL:<http://repository.lib.polyu.edu.hk/jspui/bitstream/10397/3415/2/b2239753x_ir.pdf>.
Martin, "Optimal Prediction, Alarm, and Control in Buildings Using thermal Sensation Complaints", [online] Fall 2004. Retrieved on Oct. 29, 2012 from URL:<http://ti.arc.nasa,gov/m/pub-archive/archive/PhDThesis.pdf>.

Trcka, "Co-Simulation for Performance Prediction of Innovative Intergated mechanical Energy Systems in Buildings", [online] Oct. 8, 2008. Retrieved on Oct. 29, 2012 from URL:<http://www.bwk.tue.nl/bps/hensen/team/past/Trcka.pdf>.
U.S. Appl. No. 13/479,198, filed May 23, 2012.
U.S. Appl. No. 13/274,770, Jun. 8, 2012 Notice of Abandonment.
U.S. Appl. No. 13/589,737, filed Aug. 20, 2012.
U.S. Appl. No. 13/589,916, filed Aug. 20, 2012.
U.S. Appl. No. 12/885,800, Nov. 6, 2012 Response to Non-Final Office Action.
U.S. Appl. No. 12/885,800, Jul. 9, 2012 Non-Final Office Action.
Amoedo, "A Structured Methodology for Identifying Performance Metrics and Monitoring Maintenance Effectiveness", *M.S. Dissertation*, University of Maryland, College Park, United States, (2005).
Barabady, et al. "Availability Allocation Through Imprtance Measures", *The International Journal of Quality & Reliability Management*, 24(6):643-657 (2007).
Bhatt, "The Application of Power Quality Monitoring Data for Reliability Centered Maintenance" EPRI (Electric Power Research Institute, Inc.) 152 pages (2000).
Bickel, et al., "Semiparametric Inference and Model", Sep. 5, 2005 [retrieved on Jul. 23, 2012] Retrieved from the internet: URL:http://www.stat.washington.edu/jaw/JAW-papers/NR/jaw-BKR-EneylSS.pdf entire document.
Liu, et al., "Weighted Nonparametric Maximum Likelihood Estimate of a Mixing Distribution in Nonrandomized Clinical Trials", Feb. 20, 2006 [retrieved on Jul. 23, 2012] Retrieved from Internet: URL:HTTP://www.stat.purdue.edu/~junxie/Papers/weightedSBR.pdf> entire document.
Cameron, "Microeconometrics: Methods and Applications", *Cambridge University Press*, p. 333 (2005).
Chen, "Distributed Multi-Modal Human Activity Analysis: From Algorithms to Systems", *Ph.D. dissertation*, Princeton University, United States, New Jersey, (Retrieved Mar. 25, 2012).
Hobbs, "Optimization Methods for Electric Utility Resource Planning", *European Journal of Operational Research*, pp. 1-20 (May 18, 1995).
International Search Report for PCT/US2010/024955, dated Apr. 23, 2010.
International Search Report and Written Opinion for PCT/US2012/050439, dated Oct. 22, 2012.
International Search Report and Written Opinion for PCT/US2012/033309, dated Aug. 1, 2012.
Keeney, et al., "Evaluating Improvements in electricity Utility Reliability at British Columbia Hydro", *Operations Research*, 43(6):933-947 (Nov./Dec. 1995).
Naidu, et al., "An Empirical Model for Maintenance Strategy Selection Based on Organization Profit", *Proceedings of the 2009 Industrial Engineering Research Conference*, pp. 1765-1770 (Jan. 2009).
Chambal, "Advancing Reliability, Maintability, and Availability Analysis Through a Robust Simulation Environment", *Ph.D. Dissertation*, Arizona State University, United States (1999).
Chen, "Performance and Control of Parallel Multi-Server Queues with Applications to Web Hosting Services", *Ph.D. Dissertation*, The Pennsylvania state University, United States (2006).
International Search Report and Written Opinion for PCT/US09/37995, Sep. 24, 2009.
U.S. Appl. No. 13/214,057, filed Aug. 19, 2011.
U.S. Appl. No. 13/274,770, filed Oct. 17, 2011.
U.S. Appl. No. 11/349,711, Mar. 13, 2008 Issue Fee payment.
U.S. Appl. No. 11/349,711, Feb. 22, 2008 Notice of Allowance.
U.S. Appl. No. 11/349,711, Dec. 14, 2007 Response to Non-Final Office Action.
U.S. Appl. No. 11/349,711, Aug. 17, 2007 Non-Final Office Action.
U.S. Appl. No. 12/178,553, Apr. 5, 2011 Issue Fee payment.
U.S. Appl. No. 12/178,553, Jan. 7, 2011 Notice of Allowance.
U.S. Appl. No. 12/178,553, Dec. 2, 2010 Response to Non-Final Office Action.
U.S. Appl. No. 12/178,553, Jun. 4, 2010 Non-Final Office Action.
U.S. Appl. No. 12/045,458, Sep. 6, 2011 Issue Fee payment.
U.S. Appl. No. 12/045,458, Jun. 3, 2011 Notice of Allowance.
U.S. Appl. No. 12/045,458, May 10, 2011 Response to Non-Final Office Action.

(56) References Cited

OTHER PUBLICATIONS

U.S. Appl. No. 12/045,458, Jan. 10, 2011 Non-Final Office Action.
U.S. Appl. No. 12/045,458, Oct. 28, 2010 Response to Non-Final Office Action.
U.S. Appl. No. 12/045,458, Apr. 30, 2010 Non-Final Office Action.
U.S. Appl. No. 12/019,347, Nov. 17, 2011 Advisory Action.
U.S. Appl. No. 12/019,347, Oct. 24, 2011 Amendment and Request for Continued Examination (RCE).
U.S. Appl. No. 12/019,347, Jul. 25, 2011 Final Office Action.
U.S. Appl. No. 12/019,347, Jun. 8, 2011 Response to Non-Final Office Action.
U.S. Appl. No. 12/019,347, Dec. 8, 2010 Non-Final Office Action.
Shervais, "Adaptive Critic Based Adaptation of a Fuzzy Policy Manager for a Logistic System", *IEEE*, 0-7803-7078, pp. 568-573, 2001.
Begg et al., "The Value of Flexibility in Managing Uncertainty in Oil and Gas Investments", *SPE 77586*, pp. 1-10, 2002.
Saputelli et al., "Real-time Reservoir Management: A multiscale adaptive optimization and control approach", [Online] Downloaded Nov. 29, 2010, *Computational Geosciences Springer 2006*, http://www.springerlink.com/content/4175n8841743684v/fulltext.pdf; vol. 10: 61-96.
Long et al., "Martingale Boosting", *COLT 2005, LNAI 3559*, pp. 79-94, Jun. 2005.
Auer et al., Learning Theory, 18th Annual Conference on Learning Theory, COLT 2005, Bertinoro, Italy, Jun. 27-30, 2005, Proceedings. *Lecture Notes in Computer Science*, 3559.
International Search Report and Written Opinion for PCT/US2009/037996, dated May 19, 2009.
International Search Report for PCT/US2010/036717, dated Jul. 28, 2010.
International Search Report for PCT/US2004/28185, dated Feb. 11, 2005.
International Search Report and Written Opinion for PCT/US2011/044389, dated Dec. 14, 2011.
Kong et al., "Web-based monitoring of real-time ECG data", *Computers in Cardiology*, 27: 189-192, 2002.
"The meaning and use of the area under a receiver operating characteristic (ROC) curve", Hanley et al., *Radiology*, 143: 29-36, Apr. 1982.
"Reliability centred maintenance strategy for high voltage networks", Zdrallek, Sep. 2004, *8th International Conference on Probabilistic Methods Applied to Power Systems*, pp. 332-337.
"Predicting electricity distribution feeder failures using machine learning susceptibility analysis", Gross et al., 2006, *AAAI, Proceedings of the 18th Conference on Innovative Applications of Artificial Intelligence*, pp. 1705-1711.
Shortened version of chapter 6 of the book "Artificial intelligence techniques in power systems", Warwick, *IEE Power Engineering Series 22*, 1997.
Venayagamoorthy et al., "Experimental studies with continually online trained artificial neural networks identifiers for multiple turbogenerators on the electric power grid", 2001, *IEEE*, 0-7803-7044, pp. 1267-1272.
Rajan, "Demand Side Management Using Expert Systems: 2003, TENCON 2003,Conference on Convergent Technologies for Asia-Pacific Region" *IEEE*, 0-7803-7651.
Rudin et al., "Predicting Vulnerability to Serious Manhole Events in Manhattan: A Preliminary Machine Learning Approach", Submitted for Journal, Dec. 2008, Retrieved online on Nov. 29, 2011 at : <http://wwwl.ccls.columbia.edu--rudin/RudinEtAI2008_ManholeEvents.pdf>, Entire Document.
Barry et al., "Applications of Learning Classifier Systems, Data Mining using Learning Classifier Systems", Springer, May 27, 2004, pp. 15-67, Retrieved online Nov. 29, 2011 at : <http://books.google.com/books?id=aBljqGag5-kC&lr=&source=gbs_navlinks_s>.
U.S. Appl. No. 12/777,803, Apr. 1, 2013 Non-Final Office Action.
U.S. Appl. No. 12/909,022, Mar. 14, 2013 Non-Final Office Action.
U.S. Appl. No. 13/646,939, Apr. 2, 2013 Non-Final Office Action.
U.S. Appl. No. 14/341,718, filed Jul. 25, 2014.
U.S. Appl. No. 14/047,879, filed Oct. 7, 2013.
U.S. Appl. No. 14/177,020, filed Feb. 10, 2014.
U.S. Appl. No. 12/885,800, Sep. 8, 2014 Final Office Action.
International Search Report and Written Opinion for PCT/US2013/069762, dated Mar. 6, 2014.

US 8,972,066 B2

DECISION SUPPORT CONTROL CENTERS

CROSS-REFERENCE TO RELATED APPLICATIONS

This application is a continuation of International Application No. PCT/US2009/037995, and claims the benefit of U.S. Provisional Application Ser. No. 61/038,650 filed on Mar. 21, 2008, which are incorporated by reference in their entirety herein, and from which priority is claimed.

COPYRIGHT NOTICE

A portion of the disclosure of this patent document contains material which is subject to copyright protection. The copyright owner has no objection to the facsimile reproduction by any one of the patent disclosure, as it appears in the Patent and Trademark Office patent files or records, but otherwise reserves all copyright rights whatsoever.

FIELD

The disclosed subject matter relates to an integrated decision support "cockpit" or control center for displaying, analyzing, and/or responding to, various events and contingencies that can occur within an electrical grid.

BACKGROUND

Power utilities generate electrical power at remote plants and deliver electricity to residential, business or industrial customers via transmission networks and distribution grids. Power is first transmitted as high voltage transmissions from the remote power plants to geographically diverse substations. From the substations, the received power is sent using cables or "feeders" to local transformers that further reduce the voltage. The outputs of the transformers are connected to a local low voltage power distribution grid that can be tapped directly by the customers. The power distribution grids can be configured as either radial or networked systems. A radial distribution system includes a number of feeder circuits that extend radially from a substation. Each circuit serves customers within a particular area and the failure of a radial circuit cuts off electric service to the customers on that circuit. In a networked distribution system, service is provided through multiple transformers connected in parallel, as opposed to the radial system in which there is only one path for power to flow from the substation to a particular load. A networked distribution system provides multiple potential paths through which electricity can flow to a particular load.

By its nature, a networked distribution system can be more reliable than a radial distribution system. When a networked distribution system is properly designed and maintained, the loss of any single low or high voltage component does not usually cause an interruption in service or degradation of power quality. Nevertheless, large events, such as feeder outages, transmission and substation events do occur, along with less substantial, although still important problems, such as low voltage complaints and distribution feeder failures remain. When a feeder fails, its substation protection circuitry will isolate it from its power supply in the substation automatically and are called "Open Autos" or O/As. When an O/A occurs, the load that had been carried by the failed feeder must shift to adjacent feeders, further stressing them. O/As put networks, control centers, and field crews under considerable stress, especially during the summer, and cost millions of dollars in operations and maintenance expenses annually.

Providing reliable electric supply requires active or continuous "control room" management of the distribution system by utility operators. Real-time response to a disturbance or problem may, for example, require redirecting power flows for load balancing or sectionalizing as needed. The control room operators must constantly monitor the distribution system for potential problems that could lead to disturbances. Sensors may be used to monitor the electrical characteristics (e.g., voltage, current, frequency, harmonics, etc.) and the condition of critical components (e.g., transformers, feeders, secondary mains, and circuit breakers, etc.) in the distribution system. The sensor data may guide empirical tactics (e.g., load redistribution in summer heat waves) or strategies (e.g., scheduling network upgrades at times of low power demand in the winter), and provide indications of unique or peculiar component life expectancy based on observations of unique or peculiar loads.

Often information about an electrical grid is not presented in an integrated fashion, as it is contained in as many as 20 separate applications that may each require separate security details (e.g. separate applications each requiring a separate log-in and password). Once logged in, the operator must drill-down to navigate through the applications to obtain the information he or she needs to analyze the contingency and respond.

For example, following an open auto of network feeder, operators need to communicate and coordinate the collection of a variety of information. Field personnel may report a manhole fire, station personnel may report relay targets and regional control center personnel may be reviewing Power Quality (PQ) node data and still others may be reviewing the specific PQ (power quality) application, RTF (reactance to fault), i.e., frequency, impedance and amplitude data to determine the location of a cable fault.

Accordingly, there is a need in the art for an approach to decision support which overcomes the limitations of the prior art and allows an operator to accurately, and quickly, identify and respond to contingencies based on an integrated view of the electrical grid which he/she is controlling.

SUMMARY

The presently disclosed subject matter provides an integrated decision support "cockpit" or control center for displaying, analyzing, and/or responding to, various events and contingencies that can occur within an electrical grid.

One aspect of the disclosed subject matter provides, within an integrated platform, a decision support control center. The control center can include a real time status overview of an electrical grid, a substation status, a topographical display of at least a portion of an electrical grid, an electrical feeder status display, a decision support interface, an alarm manager, a susceptibility to failure interface, and/or a contingency analysis interface. In one embodiment, the disclosed subject matter provides, within an integrated platform, a decision support control center that combines data display functionality with data analysis functionality.

Another aspect of the present application provides an integrated decision support control center system to permit an end user to monitor the status of at least a portion of a utility network. The integrated decision support control center includes one or more processors, each having respective communication interfaces to receive data from the utility network. The data includes real time utility network data. The system also includes one or more software applications, operatively coupled to and at least partially controlling the processors, to process the real time utility network data and determine whether a change in condition has occurred. The system also includes a display, coupled to the one or more processors, for visually presenting the depiction of utility network, including any changes in condition thereof, in an integrated manner.

Another aspect of the present application provides a method for operating an integrated decision support control center system to permit an end user to monitor the status of at least a portion of a utility network. This method includes receiving real time utility network data from the utility network and determining, from the received real time utility network data, whether a change in condition in the utility network has occurred. The method also includes displaying a depiction of at least the portion of the utility network, including any determined changes in condition thereof, in an integrated manner.

Another aspect of the present application provides an integrated decision support control center system to permit an end user to monitor the status of at least a portion of a utility network. The system includes communication interface means for receiving data from the utility network, the data including real time utility network data. The system further includes data processing means, coupled to the communication interface means, to process the real time utility network data and determine whether a change in condition has occurred. The system also includes display means, coupled to the data processing means, for visually presenting said a depiction of the utility network, including any changes in condition thereof, in an integrated manner.

BRIEF DESCRIPTION OF THE DRAWINGS

Further objects, features and advantages of the disclosed subject matter will become apparent from the following detailed description taken in conjunction with the accompanying figures showing illustrative embodiments of the disclosed subject matter, in which.

While the disclosed subject matter will now be described in detail with reference to the figures, it is done so in connection with the illustrative embodiments.

DETAILED DESCRIPTION

The presently disclosed subject matter is directed to a decision support cockpit for control centers that connects existing, legacy systems and new applications into an expanding network that provide valuable information regarding multiple components of an electrical grid. By integrating existing data into one application, the decision support cockpit extracts vital information that is currently usually contained in various applications and places such data in front of the operator in an easily accessible and digital format. Furthermore, certain embodiments of the presently disclosed subject matter display only selected information (e.g. information deemed critical).

Figure 1:
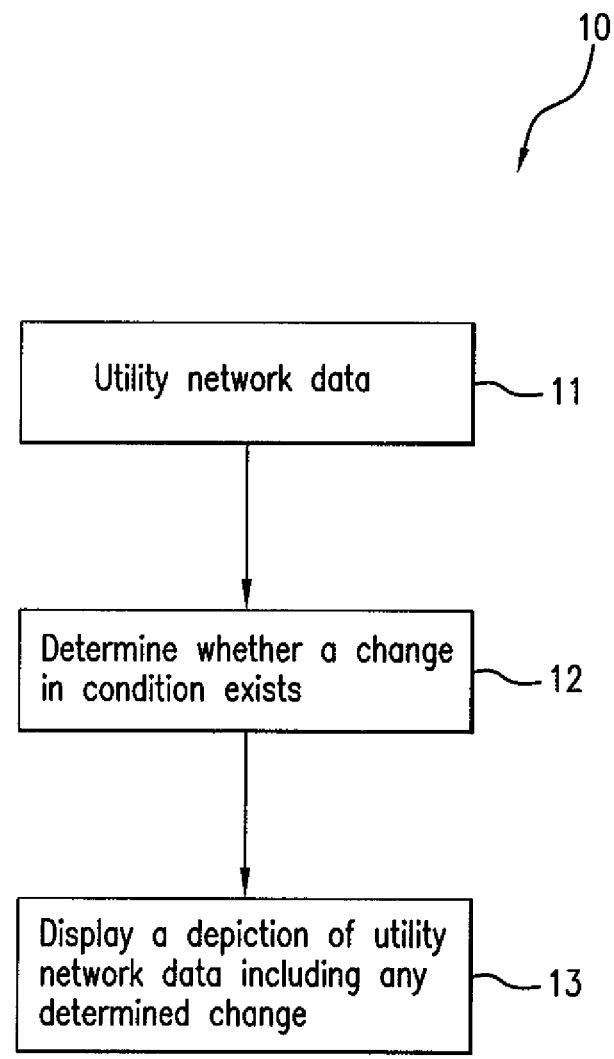
FIG. 1 depicts a flow diagram of a method of operating an integrated decision support control center system to permit an end user to monitor the status of at least a portion of a utility network.

Referring to FIG. 1, a method for operating an integrated decision support control center system (10) to permit an end user to monitor the status of at least a portion of an electrical network is shown. The method includes receiving utility network data (11) from the utility network. This data is conveyed, using techniques known in the art, to a software application to determine whether a change in condition exists (12). Software that can be used for this purpose includes, but is not limited to, the Distribution Engineering Workstation (DEW), which is commercially available from Electrical Distribution Design (EDD). After such determination, the depiction of the utility network data, along with any determined change (13) is displayed on screen, such as a computer monitor or projection screen.

In certain embodiments, information is combined from multiple applications and presented to the operator in a single view. It is important to note that in certain embodiments, the applications are not integrated, but instead the data from such applications are integrated, e.g. in a single view. For example, the data can be presented in a "contingency analysis browser window." In other embodiments, the decision support cockpit is driven and updated by feeder and load event triggers. Examples of feeder and load event triggers include, but are not limited to, ground faults, "arcing," bus faults occurring at the substation, failure at solder joints, and transformer failure.

In other certain embodiments of the presently disclosed subject matter, the decision support cockpit control center also registers and stores such information for use with machine learning applications that are in communication with the display components of the control center of the present application. The machine learning applications implement "educated" action plans in response to anomalies and problems based on observed anomalies and relative rankings assigned to the anomalies based on past events. Past performance models future decision making, this is monitored and controlled using the decision support cockpits of the present application.

As used herein, the term "integrated" or "integrated display" refers to a display in which the operator can access data from the display, including drill-down access, without having to log into a separate platform. In certain embodiments, integrated displays not only provide the operator with the ability to access the data, but also provide for data communication between the different displays.

As used herein, the term "contingency" refers to an estimation of a state that puts the system as risk that can occur in the future. Examples of contingencies include, for example, contingencies based on one failure in the system ("1st contingency failure") or contingencies based on two failures in the system ("2nd contingency failure").

As used herein, the terms "anomaly" and "anomalies" includes any unusual and/or undesirable event detected with absolute certainty, based on previously collected and/or real time data collection. In certain embodiments of the present invention, anomalies are combined and weighted to predict problems that may occur in the near or distant future based on the observed anomalies. In certain embodiments, anomalies are related logically, temporally, by physical proximity and/or by logical proximity.

As used herein, the term "problem" refers to an event predicted based on observed anomalies in which the system demonstrates significant variation from the expected performance of the system. In certain embodiments, problems are prioritized based on their significance and likelihood. In other embodiments, problems are prioritized based on one or more contingencies, such as a first contingency failure or a second contingency failure.

As used herein, a "solution" is a positive action or sequence of actions that is intended to alleviate a problem. A solution may be implemented as a sequence of steps called an "action plan".

As used herein, "decision support interface" refers to any platform in which action plans are proposed to the operator and/or any platform in which operators chose to enact (or not enact) action plans.

In some embodiments, the decision support cockpit has one or more of the following attributes:
1. Providing real-time data collection and/or display where appropriate;
2. Maintaining collected data for present and future analysis;
3. Predictive features, including prediction based on weighted inputs, inputs weighted based in part of past results of such inputs to the electrical grid;
4. Animated control structure based on operator preference;
5. Capable of simulation, for example for purposes of training or predictive applications;
6. Able to replay events;
7. Able to visualize data and predicted problems, i.e. computer visual portrait of data or predicted problems; and
8. Open-ended and expandable.

In some embodiments of the presently disclosed subject matter, such displays are in communication with, and can display the output of, information obtained from Machine Learning. Details regarding Machine Learning are summarized below, and are also described in International Published Application No. 2007/087537, which is hereby incorporated by reference in its entirety.

Heads Up Display

In some embodiments, operators can relate to a standard set of displays that provide important information first in order, and all relevant system information in one organized and easy to use location. These views also, where required, provide drill-down functionality to subordinate and other supporting displays.

Particularly when combined with a Top Down view of the system (e.g., on a projection screen or similarly display, discussed below) the Heads Up Display provides the operators with a powerful integrated view that would result in quicker assimilation of system conditions which is necessary in a very dynamic environment. Additionally, the Heads Up Display will allow the operators to return to a consistent view of the system which would standardize the response to system conditions by all operators.

In some embodiments, the Heads Up Display (and other displays described herein) operates in communication with the machine learning systems described throughout this application to transmit and receive information about the electrical grid. In certain embodiments, this display integrates the data and/or user interfaces of existing/legacy systems and is flexible enough to allow the user to arrange the components (e.g., WebParts, discussed below) to his/her preference, based on the particular machine learning algorithm employed as part of the cockpit control center.

A single page interface can provide the ability to insert data components (e.g. WebParts, described below) and/or provide the operator with the ability to rearrange and personally configure each data component. In one embodiment, automated data refresh updates in real-time at user definable intervals (e.g. 60 seconds, 2 minutes, 5 minutes, etc.). In one particular embodiment, the control center provides drill-down support to get an additional level of data detail from any component of the display. In another embodiment, the control center provides asynchronous data acquisition for improved system performance to enhance operator experience with the system.

Figure 2:
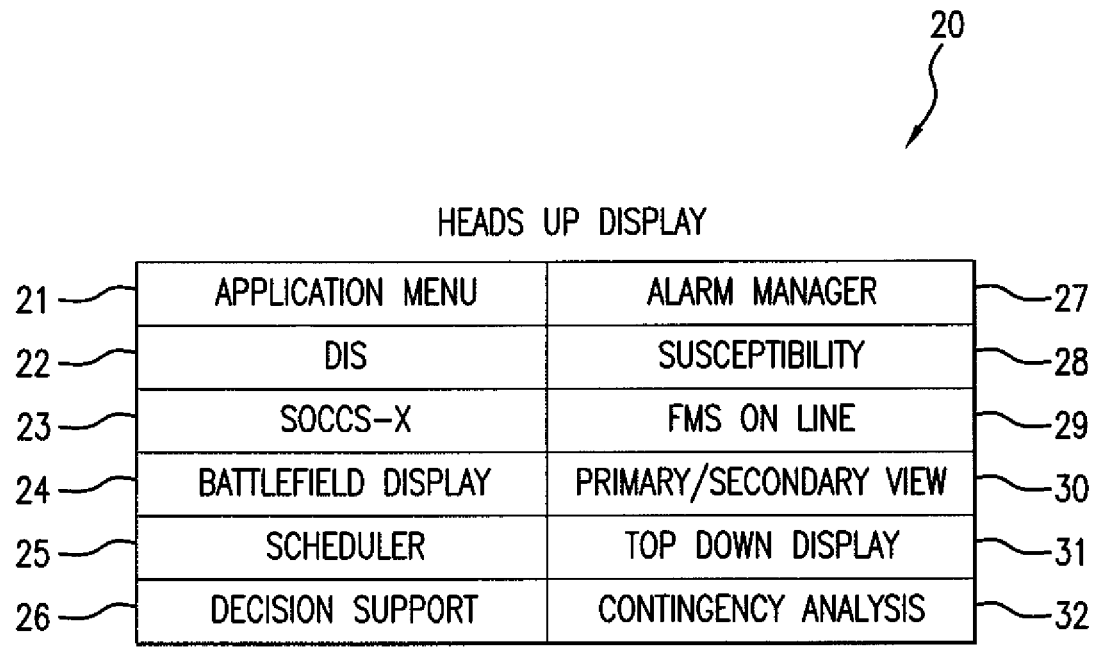
FIG. 2 depicts a non-limiting exemplary "Heads Up" control center display. In this embodiment, access is provided to other, more detailed displays or interfaces. In one particular embodiment, the Heads Up display is shown in conjunction with a topical display of the electrical grid, also referred to herein as a "battlefield view" or battlefield display.

Referring to FIG. 2, an exemplary embodiment will be described. In the embodiment, there are 12 views that are integrated within the Heads-Up Display (20):
1. An application menu (21);
2. DIS (Distribution Information System) Output (e.g. real time status of the system) (22);
3. Substation Status (SOCCS-X) (23);
4. "Battlefield," i.e. Topographic Display (24);
5. Scheduler (25);
6. Decision Support (26);
7. Alarm Manager (27);
8. Susceptibility to Failure (displays odds or likelihood of failure, or imminent failure) (28);
9. FMS (Feeder Management System, for maintenance tracking) (29);
10. Primary and Secondary Network Views (30);
11. Top Down Display, (starting with the entire area of responsibility with zoom-in capability to particular problems at the local level) (31); and
12. Contingency Analysis (evaluation by risk ranked order of what is likely to happen next so that problems can be prevented proactively) (32).

The selections shown in the exemplary embodiment discussed above are based on delivery of information in a timely and layered fashion with ease of navigation. Other selections can be incorporated, depending on particularities associated with the electric grid. The arrangement is based on a five step procedures that control center personnel go through when recognizing and responding to events:

1. Event Recognition
2. Confirmation of Event
3. Evaluation of Current Impact
4. Identify actions to mitigate current impact
5. Identify next worse contingencies.

Figure 3:
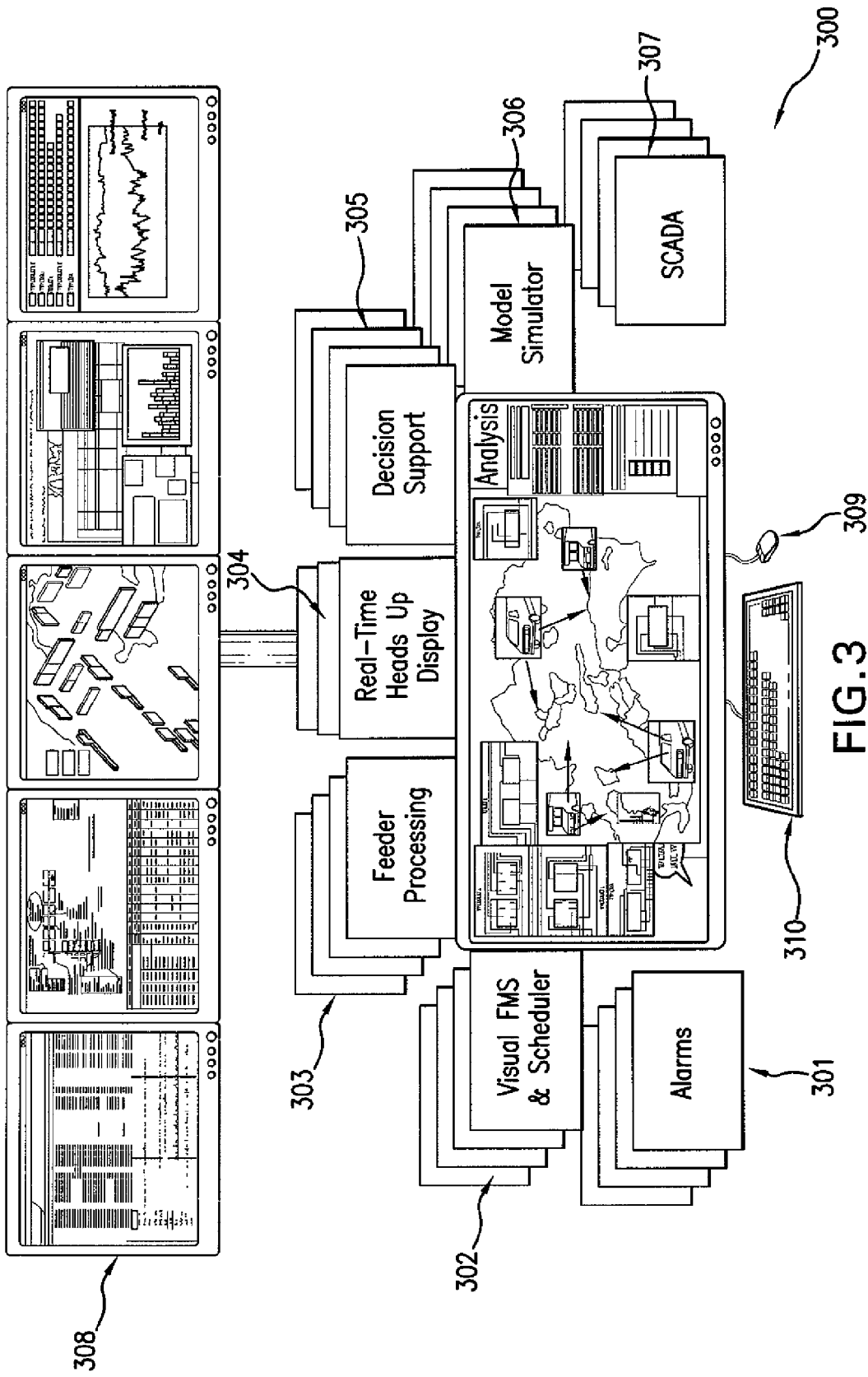
FIG. 3 depicts another non-limiting exemplary control center display. In this embodiment, multiple display screens are employed to provide both status information about the electrical grid as well as interfaces which analyzes the observed data, and proposes solutions to problems predicted based on the observed data.

Other certain embodiments of the presently disclosed subject matter employ multiple screens, thereby rendering a Heads Up Display as shown in FIG. 2 unnecessary as a "default screen" (i.e. as a screen that serves as the starting point for operator process control). As shown in FIG. 3, a specific embodiment (300) combines the functionality of alarms display (301), Visual FMS (Feeder Management System (302), feeder processing (303), a real-time display of network status (304), a decision support view (305), a model simulator view for purposes of training (306), and SCADA (Supervisory Control and Data Acquisition) (307). Multiple applications can be shown in one view using multiple screens (308). The system also includes a mouse (309) and keyboard (310), which are coupled to one or more processors coupled to memory (not shown).

Referring to FIG. 3, a client computer (not shown) and a server computer (not shown) are used in some embodiments to implement the programs of FIG. 3. The components of FIG. 3 can be software modules running on a computer, one or more processors, or a network of interconnected processors and/or computers each having respective communication interfaces to receive and transmit data. Alternatively, the software modules can be stored on any suitable computer-readable medium, such as a hard disk, a USB flash drive, DVD-ROM, optical disk or otherwise. The processors and/or computers can communicate through TCP, UDP, or any other suitable protocol. Conveniently, each module is software-implemented and stored in random-access memory of a suitable computer, e.g., a work-station computer. The software can be in the form of executable object code, obtained, e.g., by compiling from source code. Source code interpretation is not precluded. Source code can be in the form of sequence-controlled instructions as in Fortran, Pascal or "C", for example.

Various modifications and alterations to the described embodiments will be apparent to those skilled in the art in view of the teachings herein. For example, the program described in connection with FIG. 3 can be hardware, such as firmware or VLSICs, that communicate via a suitable connection, such as one or more buses, with one or more memory devices.

Many of the displays shown in FIG. 3 currently exist as separate non-integrated applications. Embodiments of the presently disclosed subject matter create linkages and locations of these screens to immerse the operator in a consistent view of the situation. In one embodiment, the scanning of legacy information (e.g. as a pdf file) that is presently in paper form is linked for ease of retrieval.

Figure 4:
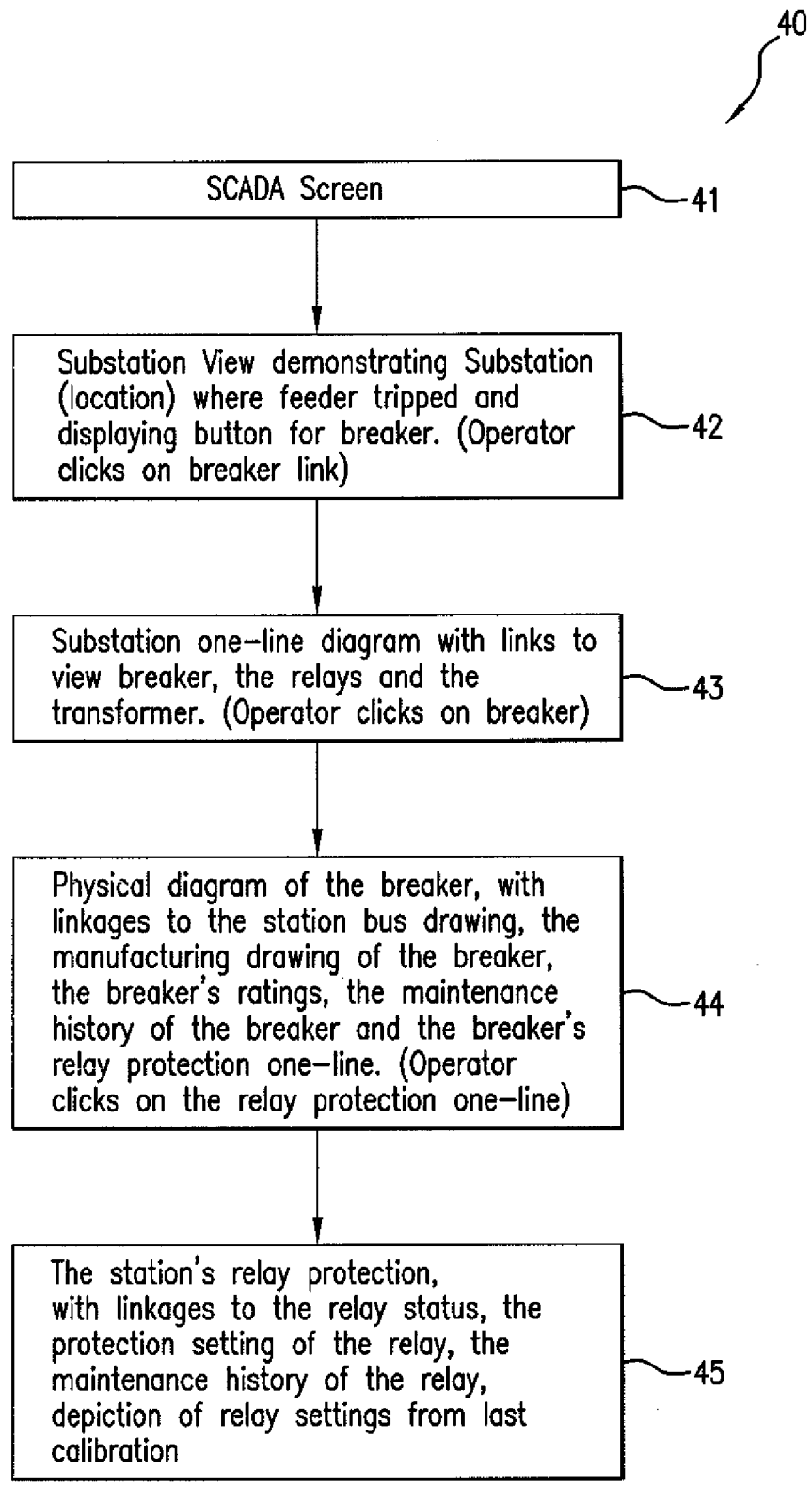
FIG. 4 is an example of a drill-down within a screen in the context of a cockpit response to a primary feeder failure.

Referring to FIG. 4, an example of a drill-down (40) within a screen will be described in the context of a cockpit response to a primary feeder failure. In the SCADA screen (41), SOCCS-X (the substation view) comes up automatically (42) showing the substation (location) where the feeder tripped. The operator clicks on button on the breaker and views the substation one-line. The operator is given links on the substation one-line diagram to view the breaker, the relays, the transformers, etc (43). The Operator can click on the breaker and see a physical diagram of the breaker (44) with linkages to the station bus drawings, the manufacturing drawings of the breaker, the breaker's ratings, the maintenance history of the breaker, the breaker's relay protection one-line, etc. The Operator can click on the relay protection one-line and view the one-line of the station's relay protection (45), with linkages to the relay status, the protection setting of the relay, the maintenance history of the relay, the paper sheets showing the relay settings from the last calibration, etc. This type of drill-down through concise locations of linkages allows efficient comprehension of specifics that could help diagnose emergent problems in an efficient manner, Top Down Display (Real Time Status Overview of Electrical Grid)

Control room operators monitor and respond to real time conditions that in many cases are rapidly developing and present significant threats to the system. Operators need to respond expeditiously to mitigate such threats in order to maintain the reliability of the system. In such an environment, the integration and presentation of information is of heightened importance.

Certain embodiments of the present application provide a robust platform that brings together, in an integrated view, information which would be needed to respond effectively. This includes, but is not limited to, bulk power substation and transmission system events as well as area stations and other distribution based events involving auto loops, unit stations, overloads, multiple feeder contingencies, load shedding and voltage reduction actions. This allows a better view of overlapping events on both the transmission and distributions systems allowing for better event management.

In certain embodiments, a detailed view of these facilities is not provided in the top down display, but instead, an alert functionality is provided that allows the operator to become aware of emerging events, coupled with drill-down capability. This allows ease of navigation to supporting displays that do contain the desired detail. The top down display provides operators with a view of emerging events on both the transmission distribution systems across the entire electric operation.

Certain embodiments of the presently disclosed subject matter also provide the ability to evaluate future conditions based on current system status and the effect of the next worse contingency. Because operating contingencies can occur quickly, it is important to place the operators in a proactive posture in order to respond effectively.

Certain embodiments of the presently disclosed subject matter also provide a visualization tool that provides a means of reviewing the events after the fact. Event replay visualization can help in analyzing the origin and cause of the event within the context that the operators view everyday. Such embodiments are also useful for training purposes.

The Primary Feeder Battlefield (Topographical Display)

The control center displays described herein are useful for providing an integrated view of electrical grid status (e.g. network and/or load area system conditions), allowing operators to navigate between various applications as part of a single tailored application. Whereas analysis of various system aspects previously often required viewing different displays on different platforms, which slowed operating response and, more importantly, may result in not perceiving any real time threats that may exist. In severe and/or rapidly developing emergencies, the methods and systems of the present invention provide information to be presented in concise, operator-oriented displays that present the most important information in priority order.

Embodiments of the presently disclosed subject matter provide a highly visible view of what an electrical grid operator needs to know immediately in order to respond to emerging threats. In certain embodiments, the emphasis begins with primary feeder processing under emergency conditions and "now" and "next-worse" contingency analysis and actions.

More particularly, in certain embodiments, the decision support cockpit facilities: a) processing of primary distributions feeders from outage to restoration; b) analyzing the network or load area contingency for the "now" case and the "next worse" cases; c) identifying and prioritizing "action items" to mitigate the "now" and "next worse" cases; and d) capturing the results of "action items" as feedback to machine learning for susceptibility rankings, as disclosed, for example, in the above noted International Published Application No. WO 2007/087537.

In certain embodiments, the topographical display, or alternatively one of the other displays described in this application, provide a visual platform (e.g. a RTF display) in which related information can be provided as selectable layers. For example, in one embodiment, a single display provides the location of manhole fires, and the estimated location of the fault as displayed, for example, by the RTF (reactance to faults).

In certain embodiments, the topographical display also contains all information about surrounding electric components that are believed to be necessary to solve problems. The display contains information regarding feeders, and their status, transformers, and their status, system load, overall risk ranking, and other usual information. In one embodiment, back feed status and relay targets, as fault information, are recorded within the single display. As those skilled in the art will appreciate, an algorithm can be used to provide fault correlation between relays, PQ node, manhole fires, reported faults and RTF, to help identify the presence of multiple faults in a timely matter. With the addition of machine learning, computer based recommendations can be presented indicating what the risk of the next worse events occurring.

In other embodiments, data to be displayed include the presence of known "D" faults, e.g. leaking joints, and other known environmental issues in underground structures relative to the fault location. In certain embodiments such data can have the effect of significantly impacting feeder processing and should be known as soon as possible. Additional conditions that can impact feeder processing involve tracing current conflicts, both during the fault locating phase as well as during feeder identification. To aid in a timely determination, certain embodiments provide a depiction of all feeders that run through the same manhole. To further increase battlefield resolution, certain embodiments provide information regarding the type of joint and or cable in the fault manhole or adjacent manholes where work will be required. The presence of 3M joints, for example, can affect the processing and repair of feeders. In addition ducting information can be provided rather than determining as a separate process. This provides a more expeditious way to insure that proper field associations are maintained.

Also through the FMS (feeder management system) and the FCR (feeder control representative or "rep") applications, the systems and methods of the present invention provide locations where employees are at work relative to the fault location. Information is also provided on the existence of Registered Tags within affected structures.

In one embodiment, different colors of the feeder one-line indicate different status of the feeder. For example, alive on back feed (ABF) suspects can be highlighted; grounded; establishing HV (high voltage) or HV on; tracing current on the feeder (and tracing current conflicts in a structure); transformers shown in color, or otherwise distinguished, and HTV icons can indicate local overloads, contingencies, dropped load now or on the next contingency. In certain embodiments, network transformer grounds placed can be visualized by a unique transformer/HTV color.

Figure 5:
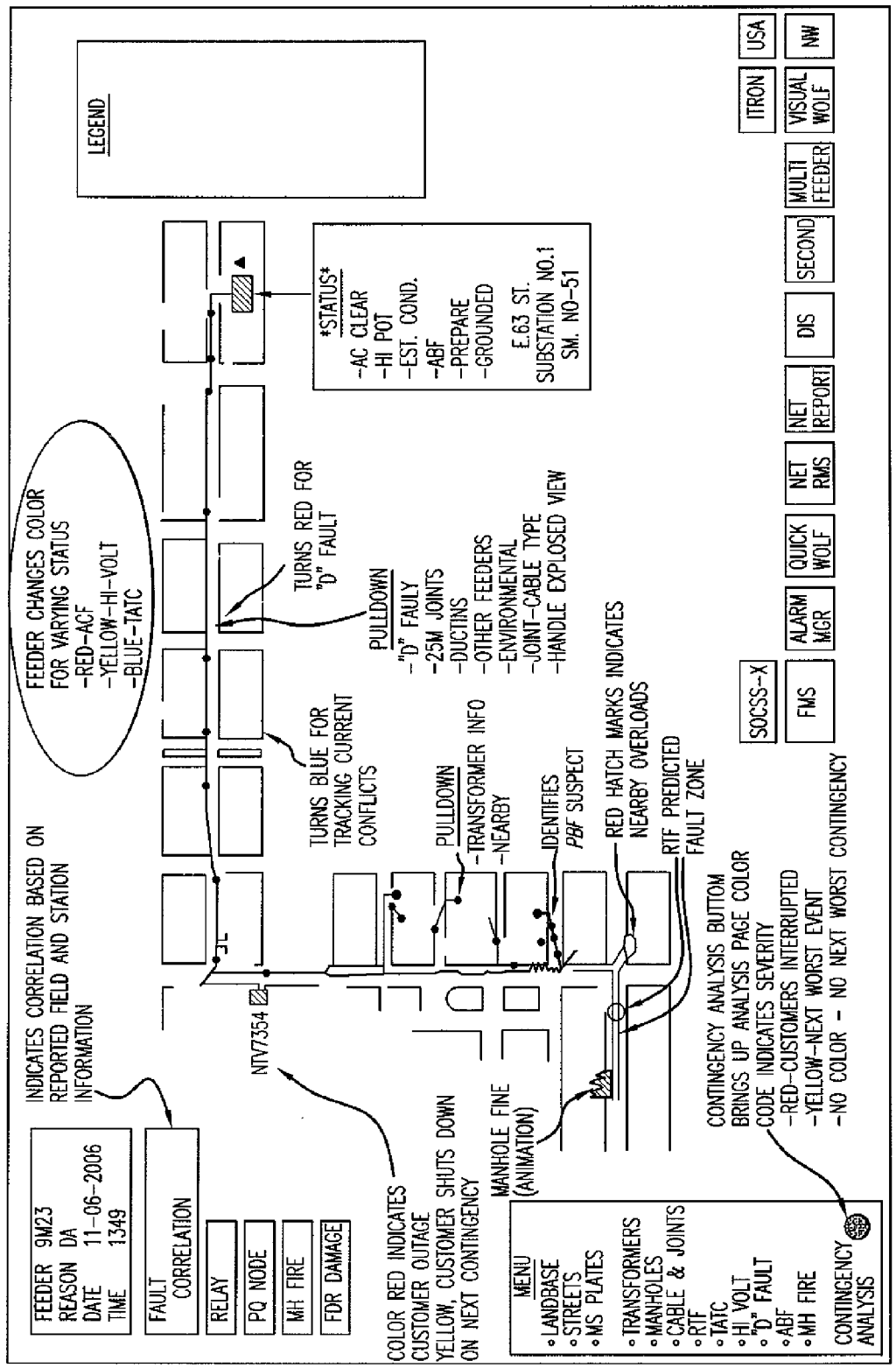
FIG. 5 depicts another non-limiting exemplary control center display. In this display, D structures with D-faults are color coded on the one-line (color not shown in Figure). A click on the structure displays the D-fault data, along with additional data such as one or more of, for example, information regarding the existence of 3M joints; an exploded manhole drawing; a list of active feeders in the manhole, duct records, and pending vactor (vacuum truck) requests and/or environmental conditions.

In certain embodiments, structures with D-faults can be color coded on the one-line. An illustrative display is set forth in FIG. 5. In this particular embodiment, a click on the structure will display the D-fault data (not the D-fault application). Additional data can be displayed such as one or more of, for example, information regarding the existence of 3M joints; an exploded manhole drawing; a list of active feeders in the manhole, duct records, and pending vactor (vacuum truck) requests and/or environmental conditions.

In other certain embodiments of the presently disclosed subject matter, smoking manholes or manhole fires reported on the run of the feeder will be visually displayed on the one-line. A click on the manhole will display the ECS ticket (outage reports resulting from, for example, a customer complaint) and remarks.

In certain embodiments of the presently disclosed subject matter, all high voltage equipment connected to the feeder can be displayed. In certain embodiments, one click on the sub-station icon can display real-time data that provides voltage, load, temperature and other vital information about area sub-station transformers and feeders. One click on a network transformer can display real-time and historical data that provides voltage, load, temperature, network protector status and other vital information about distribution transformers. One click on a high tension vault can display the high tension one-line diagram. One click on a 4 kV step-down can open a display that monitors overhead feeders and reclosers on auto-loops and step-downs. One click on a 4 kV unit station transformer can open a separate display of unit substations (e.g. the 4 kV unit station or grid).

In certain embodiments of the presently disclosed subject matter, all feeders in the network can be layered "on" or "off" with live data links when displayed. On the menu of the integrated display selectable layers of information can be chosen in any combination to present the view that most satisfies the current situation. Also, a contingency analysis button can be provided, which will register a color corresponding to various contingency situations. This allows the operator to know at a glance if he or she needs to further inquire regarding the status of a sub-unit of the grid, i.e., whether the operator needs to click on the particular sub-unit to ascertain more detailed information about the status of the particular sub-unit of the electrical grid. If no color is registered, then a contingency analysis program running in the background has completed its analysis and no contingencies, i.e. no event negatively affecting a critical component, have been identified. This eliminates the need for the operator to go through an unnecessary and laborious contingency analysis sequence.

FMS Visualization (Feeder Status)

Certain embodiments of the presently disclosed subject matter provide input to the feeder control display presenting timely and continuously updating feeder status information. Objectives achieved by such embodiments include, but are not limited to, a) visualizing within the feeder map display the status of the feeder process within the substation, b) visualizing within the feeder map display the status of the feeder process within the field and c) providing the ability to issue feeder process related orders from either the feeder map display or the FMS feeder Contingency Analysis Program (CAP), discussed further below.

In certain embodiments, the status of the feeder process can be viewed in an integrated fashion concurrent with other vital feeder and network information. This can improve electrical grid maintenance, and further provides an efficient and effective presentation of key process information which is needed during an emergency. For example, under full integration, tracing current conflicts can be automatically available to the operators when issuing order to apply tracing current. Furthermore, operators would otherwise have to view feeder maps separately from documentation tracking the feeder process. By providing an integrated geographical reference to the operators when issuing orders, there is greater assurance of a correct outcome. Additionally it provides increased automation of the process. By utilizing the mapping database, machine based recommendations for isolation and grounding strategies to the operators can be developed.

In certain embodiments of the presently disclosed subject matter, display dynamics presents a continuously updating status of the feeder process to the operators as well as actions currently in progress. This allows the operators to view the deployment of resources concurrently with a status view of the feeder. In preferred embodiments, issuing orders from the Feeder display are reflected within the feeder CAP and conversely, results from the feeder CAP should be outputted to the Feeder display.

Multi Feeder View

The above description has stressed a single feeder integrated display. Other embodiments of the presently disclosed subject matter, however, provide the ability to monitor the entire primary feeder battlefield within the network. To this end, a multi-view display is provided that depicts all feeder outages within a single network. This immediately depicts their relationship, quickly identifying logistical issues, tracing current conflicts, and current processing status. This also facilitates prioritizing feeder process response based on known field conditions. This view can constantly update as additional feeders "open auto" (O/A), and are removed from service in an emergency, fail on test, or are restored to service.

Substations

In certain embodiments of the presently disclosed subject matter, feeder associations by section at the substation are displayed, including substations that are designed with test buses. Such embodiments are helpful in those substations that are designed with test buses. In these situations, equipment and configuration conflicts can slow the restoration process and may require a change in priority or process. For example, applications that provide real-time and historical data regarding voltage, load, temperature, etc. of area substation transformers and feeders (e.g. SOCCS-X) can also display the section relationship between feeders. The station one-line diagram furnishes the details of test bus configurations.

4 KV Primary Networks

In addition to emphasizing primary network feeder display, certain embodiments of the presently disclosed subject matter also depict 4 kV unit station conflicts within the primary feeder battlefield display. This information indicates what feeders are currently out that affect the 4 kv grid and to what extent.

Overhead Auto-Loops, Step-Downs and Radial Feeders

Many network feeders, in addition to network load, supply overhead auto-loops, step-downs and multi-bank substations. A loss of one of these feeders creates a separate contingency that should also be analyzed for "now" and "next-worse" events.

Contingency Analysis Interface (CAP)

Operators within a control center benefit from systems that monitor real time status, and provide tools that evaluate system risk both presently and in the future. In order of priority the initial response to system events in one particular embodiment is indicated below:
 1. Event recognition
 2. Event confirmation
 3. Current system impact
 4. Initial mitigating actions
 5. Identify next worse contingency These events should take place as soon as possible.

In certain embodiments of the present application, network information is displayed in two nested sets of tabs or tree navigation so that context is preserved. In other words, anomalies can be observed in view of its role within the entire system and operators can seamlessly click between varying levels of detail. This can be accomplished, for example, via use of well-known AJAX Technology. Each contingency should have its own context that can be easily retrieved.

In some embodiments, the number of contingencies is reflected in the display. When a network has a first contingency, a new context is automatically created. The contingency analysis page continuously updates as new status is received.

Further embodiments of the presently disclosed subject matter provide a second level of network contingency detail, which organizes the contingency analysis for a particular network. In certain embodiments, contingency analysis will include, but is not be limited to, the following:
 1. Visual FMS—visualize the open-auto and fault locating process;
 2. Next Worse feeder—analyze contingency now and next (there are a multitude of now and next—which will occur?);
 3. Action Items—identify action items to mitigate now and next;
 4. Prioritize action items (susceptibility should prioritization);
 5. Dispatch human resource to action items;
 6. Capture action taken for machine learning;
 7. Network Area Information;
 8. Feeder Susceptibility.

In one embodiment, the quantity of data displayed (information density) will determine the number of "network contingency contexts," so as to account for limited screen space.

Currently, information on contingencies is usually not presented by exception in an integrated fashion. This requires that operators distinguish, from a large list, the areas of concern. In certain embodiments of the present invention, those conditions not representing an area of concern are not to be presented, so as to properly direct operator attention to areas that deserve attention.

Additionally, under non-integrated control displays currently in use, it is not immediately clear to the operators if a contingency occurs for the current feeder outage. This requires further search for information which may not be necessary. Therefore to assist the operators, embodiments of the present application provide a contingency analysis button in the design for the Primary Feeder Battlefield Display included in the "Heads-Up Display" (HUD), discussed above. This permits operators to see immediately if there are contingencies and degree of severity with virtually no search. This is also the drill-down point to a new Contingency Analysis application.

Additionally, severity can be more easily identified in embodiments in which color coding is added to the presentation. For example, in one particular embodiment, current severe overloads or customer interruptions can be colored red for quick identification whereas next worse contingencies can be colored yellow.

The Contingency Analysis interface presents an automated and integrated seamless display of current and next worse conditions that are continuously updated. In certain embodiments, the display is accessed by the contingency drill-down from the Contingency Button. For example, information fields can include, but are not limited to, station, network or load Area, type or class of equipment, feeder and status, and overload scenarios for current, next event and peak load. Contingency cases can be presented in priority order by severity within the context of a load area or network. Current impact cases can be the first priority. All contingencies can be visible by continuous seamless scroll down within the Contingency Analysis display. The context by feeder is also preserved and can be recalled by primary feeder query or via the Primary Feeder Battle Field display drill-down button.

In a single contingency design area multiple feeder outages present a significant challenge to operators in determining customer impact. Thus, certain embodiments of the present application summarize all outages to ATS, Auto Loop, HTV (high tension vaults) and Isolated/Multibank Network installations derived from primary feeder outages.

In certain embodiments, supporting programs known to those of ordinary skill in the art, such as WOLF (developed at Con-Ed, a powerful, on-line real-time contingency simulation) can run continuously and register contingencies automatically on the contingency analysis interface. The delivery is event driven with events being defined as current, next and peak overloads, overloads occurring at any time of day in real time as well as predicted overloads for the current case that are less then the peak case. Restoration events functions in a similar fashion clearing from the Contingency Analysis display as overloads for current situation, next worse, predicted overloads for the current case that are less then peak and peak cases are resolved.

Certain embodiments of the presently disclosed subject matter provide, within the HUD single feeder view, the ability to graphically live end-cap several transformers or a spur and generate a contingency analysis test case to determine effect on the network and if the live end cap is a viable option for feeder restoration.

Embodiments of the present application also provide drill-down or poke points (e.g. mouse sensitive areas on the graphical display) for easy access to supporting programs for use when more information is required. The poke points can go well beyond a hyperlink to another application. Juggling separate applications is a laborious process requiring, in many cases, a separate login and subsequent search for the needed information. The poke points described herein present the operator with the information he or she needs regarding the contingency.

Certain embodiments of the present application provide selection points, to provide different views by filtering information. In the Header, for example, the operator has the ability to select from 3 choices: "network only", "radial only" and "all," and in the categories for transformers, primary and secondary cable, selection is available for "now", "projected" and "peak" cases. This permits filtering of the view for the selected case. Selecting "now", for example, would universally change the entire Contingency Analysis display to the "now case for transformers, primary and secondary cable Fault Correlation As previously mentioned the ability to quickly validate the presence of a fault is essential when responding to emergencies. There are a variety of conditions where it is not clear if a fault exists of if there is more then one fault impacting the ability to make quick restoration decisions. In certain embodiments, this functionality is provided in the Primary Feeder Battle Field (topographical) display, providing immediate confirmation of a fault by comparing relay information available through the FMS interface as described in the FMS visualization section and data available from PQ Node and the RTF fault application.

In one particular non-limiting embodiment, fault correlation consists of four components, two of which (components (c) and (d) below) can provide an improved contribution to correlation certainty. The components are: a) manhole fires as derived from ECS, b) reported faults within FMS, c) PQ Node and d) relay information reported within FMS. Lack of fault correlation may dictate the performance of a proof test, fault location by electrical means or rapid restoration. The system can provide the ability to quickly choose from these options. The Battlefield display indicates the presence of one or more of the fault correlation components. The fault correlation bar provides a visible indication of correlation certainty.

Components (WebParts)

It is important to note that one or more of the components described as part of any of the displays or interfaces may removed and added to any of the other displays or interfaces described herein. Components can be combined based on the particular needs of the system to which it is employed. For example, certain embodiments of the presently disclosed subject matter can include a feeder monitor. The feeder monitor can contain a color coded list of feeders not in service. Some embodiments can also provide drill-down access to a feeder details view and/or a link to a feeder history page that displays and/or integrates FMS, feeder status, rapid restore and CAJAC (asset failure history) data and functionalities.

Figure 6:
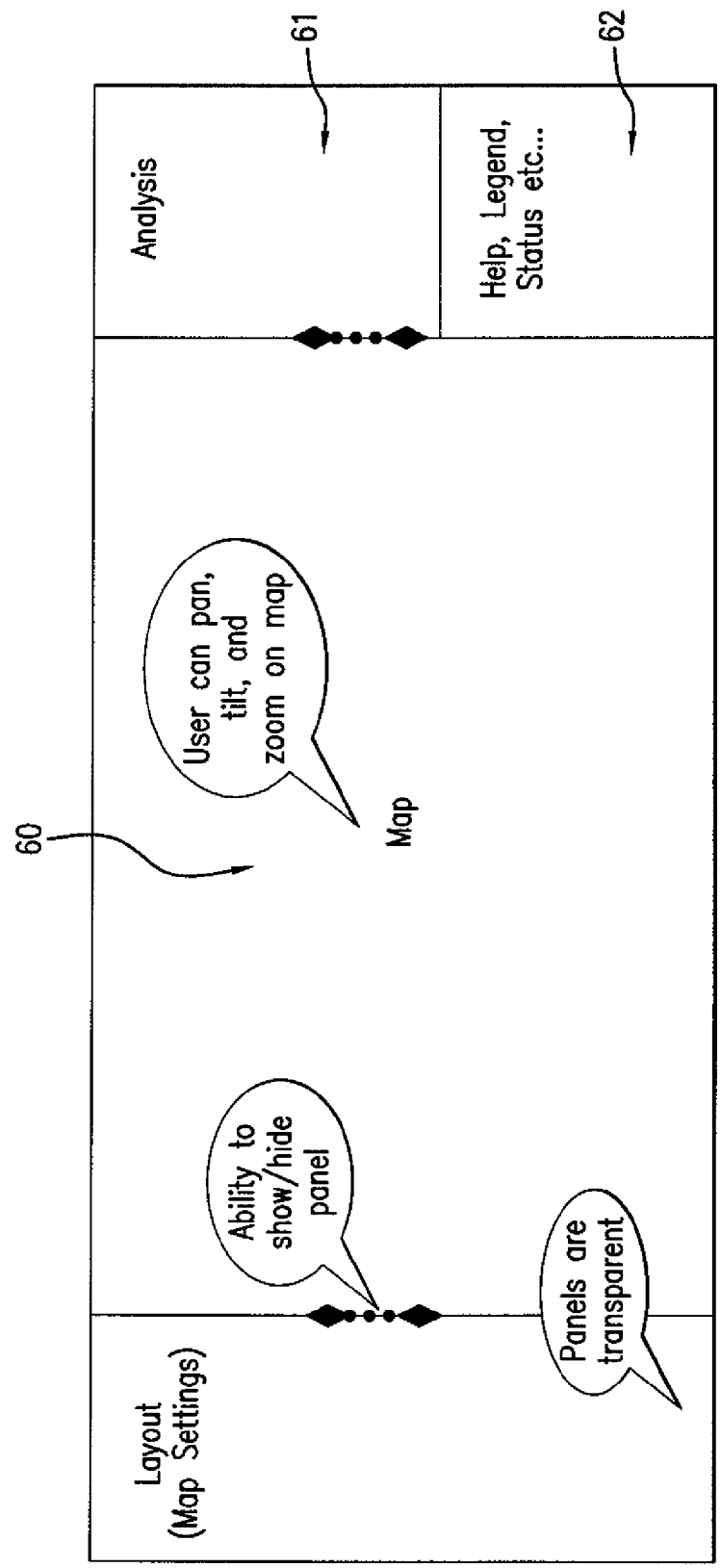
FIG. 6 displays an exemplary display which provides the operator which flexibility to configure the display according to personal preference. In this exemplary embodiment, a map of the electrical grid (e.g. a topographical display) is provided in the center, which analysis functionality shown in the upper right hand corner, and help support provided in the lower right hand corner.

The displays and interfaces described herein can also include transparent panels. Further, panels can be configured to be shown or hidden, depending on operator preference. An exemplary embodiment is shown in FIG. 6, in which a map of the electrical grid (e.g. a topographical display) is provided in the center (60), which analysis functionality shown in the upper right hand corner (61), and help support provided in the lower right hand corner (62).

In one particular embodiment, a link is provided to view the feeder print and get a DIS summary of the feeder. There can be over a dozen other tightly integrated data sources provided for decision support. These data sources can be grouped by network with drill-down to Network Contingency Views.

Other certain embodiments of the presently disclosed subject matter provide a susceptibility to failure interface. For example, a chart of Jeopardy values (a type of reliability analysis software) with assigned Feeder Susceptibility values, determined, for example, based on the techniques disclosed in the above noted International Published Application No. WO 2007/087537 and U.S. Pat. No. 7,395,252, which is hereby incorporated by reference in its entirety.

Other certain embodiments of the presently disclosed subject matter register and display pending ECS tickets. More particularly, the system can provide a list of all unassigned ECS tickets with customers out. Further details regarding ECS ticket views can be provided via drill-down functionality. Embodiments of the present invention also provide a link to ECS ticket analysis display and CAIDI/SAIFI indicators.

One particular embodiment of the presently disclosed subject matter provides a display showing the top five BO (transformer banks off) and OM (open mains). Drill down access is provided to BOOM (banks off/open mains) Analysis Pages. In one particular embodiment, the BO and OM values are ranked, based on, for example, density of BO and OM events. A drill-down to BOOM Analysis Page can also be provided.

In an embodiment, information regarding problem transformers, such as VDAMS (distribution SCADA data) load, temperature data and similar information can be provided. Transformer displays can include drill-down for details to Transformer Status Summary Page. Susceptibility ranking of each transformer can likewise be provided.

In one particular embodiment, a heat map (NetMap) with colored M&S (mains and service boxes) plates (section maps of the secondary), and ranked according to the number of BO and OM events occurring on the plates, is provided. A heat map can be provided per network, and used to highlight feeder outages and/or provide a drill-down to M&S Plate View.

Certain embodiments of the presently disclosed subject matter employ a Network Contingency View drill-down component. The network contingency view drill-down component can provide one or more of a list of feeders out, a link to network summary pages from DIS and substation display, a link to run Multiple Feeder Search, Nearby Analysis, and/or Next Worse Feeder reports for the feeders currently out. Also, the network contingency view drill-down component provides SF6 and KPS devices located in the network on the feeders currently out. Network Jeopardy and Susceptibility list for all the feeders in the network. A list of feeder restrictions in the network can also be provided. In one embodiment, the integrated Next Worse Feeder Report results are displayed for the network.

Certain embodiments also provide a list of Banks Off in the network that are either supplied by the feeders out or are nearby to transformers supplied by the feeders out. Also provided in certain embodiments of the present invention provide a list of Open Mains in the network which are near to transformers supplied by the feeders out. A list of one or more of a CAMP (critical and sensitive) customers supplied by the feeders out (e.g. hospitals, emergency centers, scientific labs, etc.), LSE (life-sustaining equipment) customers supplied by the feeders out, D-Faults in the network, a list of VDAMS Banks in the network supplied by the feeders out, and a list that shows nearby transformer load.

Other embodiments provide a list of ECS customer outages in Network with indication if the ticket falls on a HotZone (i.e., multiple calls from the same location). Tickets include any with indicated customer outage count or trouble type of NL or NLA (no light trouble types).

A template interface can provided, along with a categorized list of operator options. This design is generally flexible enough to accommodate a sufficient number of reasonable operator requests.

In certain embodiments, a layout section is provided that allows the operator to customize the screen according to the current task being performed. Additional options can fit into one of several sub categories as discussed below.

The layout section can contain many preset options, such as those described below. A dropdown list can contain preset configurations the operators can select to customize the screen from, for example, executive view to a specific operator function. One embodiment of the presently disclosed subject matter provides a focus setting that determines the level of details on the map and affects the symbols used. This focus setting can affect the level of automatic analysis, and actions automatically performed. This is distinguished from a zoom function, which is a function of the map itself and available at every focus. For each focus level, the operator can be prompted to select a given target (network name for network, plate name for plate, etc.). Despite the specified target, the operator can pan to nearby targets (e.g. nearby plates). For example, when focusing on a target feeder, other feeders are visible but grayed out. In certain embodiments, an auto screen is provided in which focus is determined by zoom level.

Certain embodiments provide an executive view that is broken down by particular districts, wards, boroughs, etc.), a network view for network contingencies, a feeder view with provides information about single feeder outages and feeder processing, a plate view for secondary studies and monitoring transformers.

Certain embodiments provide a coordinate system that is useful for specific tasks. For example, identifying impact to a 4 KV grid or feeder to a mass transit system (e.g. N.Y. Transit Authority) can be easier to do on a "one-line diagram" rather than in a full scale map. Operators have the flexibility to switch between the reference coordinate systems. Schematic (logical), GIS (geospatial) functionalities are also provided. Topology views can also include background for the map, primary grid (GIS), secondary grid (M&S Plates), Satellite imagery, and Map (land-base) views.

Static Assets include support click and hover to provide additional information, including, Static Assets, Area Substation, Unit Substation, Transformers, Manholes, Service Boxes, Primary Mains, Secondary Mains, and duct information. Information regarding, for example, resources such as emergency trucks and flush trucks can be displayed and integrated therein. Customer information is also provided, for example, by Iso/Spot (isolated and spot networks), HTV (high tension vault), LSE (life-sustaining equipment), Multibanks, Loops, Step Downs, etc. Local conditions, such as the weather, load, and susceptibility to failure can be displayed.

In some embodiments, anomalies are associated with an item from the assets category. These options have the effect of augmenting the symbols and additional information of the assets. Anomalies include, but are not limited to, banks off, open mains, D-Faults, environmental hazards, overloaded banks, overloaded feeders, open network protectors, blown fuses, manhole fires, and smoking manholes.

Alarms can also be provided. For example, clicking on an alarm can either bring an operator to a specific point on the map or open up a pop-up window with details about details about the given problem. Alarms can also be based on customer outages, overloaded banks, and approaching relevant weather events, such as thunderstorms.

A Help/Legend/Status section can be included, and, for example, can be populated with asset details on a left-click of that asset (right-click brings up a popup).

Preferences

In some embodiments, the system is aware of the current operator and his or her preferences. Accessing external systems does not require re-entry of login credentials (single sign-on). The following preferences are provided by systems of the present invention include, but are not limited to, default region, default borough, default network, default preset (work mode).

Focus Levels

Embodiments of the presently disclosed subject matter provide differing levels of focus, for example, a corporate focus, a network focus, a feeder focus, or a plate focus. Corporate focus can include an outline of all boroughs in Con Edison electric supply system, outline of all networks, 4 KV Grids, and Autoloops, symbols for Bulk Power, Transmission, and Unit Substations, color of network based on secondary problems and the color of stations based on stations problems (feed from the Rules Engine), display of the number of feeder out at each station, pop-up details on mouse over station, drill-down on click.

Other embodiments can include a network focus that includes one or more of a display of one Network/4 KV Grid/Autoloop at one time, M&S plate boundaries on top of the corporate view, display transformers, HTV, and major customers color coded by status.

Decision Support

In some embodiments, a decision support system is provided that assists operators during emergencies as well as with proactive system maintenance. This decision support system can operate in conjunction with any one of the control center displays described in this application. As such, the system can provide thorough and particular analysis of large events (e.g. feeder outages) as well as continuously monitor less significant problems (e.g. low voltage complaints and open mains) for emerging problems even when there are no contingencies.

The decisions support suggestions can be categorized into two classes: suggestions based on real data such as SCADA and topology and suggestions based on inference from models and statistics. The system can close a feedback loop required for reinforcement learning by capturing the actions taken on the system and the effects of those actions.

Reasoning

Certain embodiments of the present application provide a system which engages in reasoning, and not only displays data that is indicative of problem (e.g. anomalies), but can inform the operator whether or not a problem actually exists and can propose and/or initiate an action plan to correct the problem.

Such reasoning can occur based on addressing three basic questions or areas of concern. First, the system describes the actual status of the electrical grid, preferably in real-time. In this regard, the system notes whether are adequate resources available, such as the number of crews currently working, and the number of personnel on call and the amount of equipment at their disposal. Any customer complaints (e.g. CAIDI/SAIFI, which measure reliability, from a system and customer-oriented perspective) and current response times to such complaints are also noted by the system. Second, the system notes the extent of the problem on customer service and the impact on equipment within the electrical grid. Third, the system determines, based on the present problem, what is the next problem based on, a specified contingency. Such contingencies can be based on, for example, impact on customer service and/or impact on components within the electrical grid.

In responding to specified contingencies, the system can forecast problems based on predictive modeling and machine learning, as disclosed, for example, in the aforementioned International Publication No. WO 2007/087537.

In other embodiments, a system is provided that combines one or more of data integration, data visualization, decision support and, the ability to record data as it occurs in real time, and then input that data into machine learning and statistical algorithms.

The system, which will be described in connection with FIG. 7, combine data integration, visualization, decision support and tracking feedback and includes a rules engine, a dashboard view, and a graphic visualization functionality. The rules engine of the system can accomplish one or more of identifying escalating problems, including in certain embodiments, identifying escalating problems before they occur, tracking anomalies as they occur and as they are repaired, assisting the operator in resolving anomalies during emergencies, and/or as part of a proactive maintenance plan.

Machine Learning

The cockpit control centers can be used in conjunction with machine learning. Together, the collective system can monitor the list of anomalies to predict and/or infer problems, perform root-cause analysis of potential problems based on the contributing anomalies, prioritize the list of problems to determine the contributing weights of each anomaly to each problem by monitoring the performance of problem prediction, and determine the suggested solutions by monitoring the effect of operator actions on problem resolution.

Operators manually monitor the list of anomalies, with the ability of filtering the list by category, time and location. The operators also have the ability to interact with system by acknowledging potential problems and usefulness of the action plan.

Furthermore, operators play an important role when machine learning capabilities are combined with any one (or more) of the display embodiments disclosed in this application. When machine learning predicts a problem based on observed anomalies, the control cockpit display provides the functionality of allowing the operator to enter whether or not the predicted problem is valid, and to further indicate which suggested actions, if any, were undertaken in response to the problem. The display also provides the functionality of allowing the operator to indicate whether the problem was resolved via the suggested actions. These actions provide the ability of the machine learning to "learn" from the results of actions taken in the past in order to better predict and identify problems in the future, and to provide more effective action plan recommendations in the future.

Figure 7:
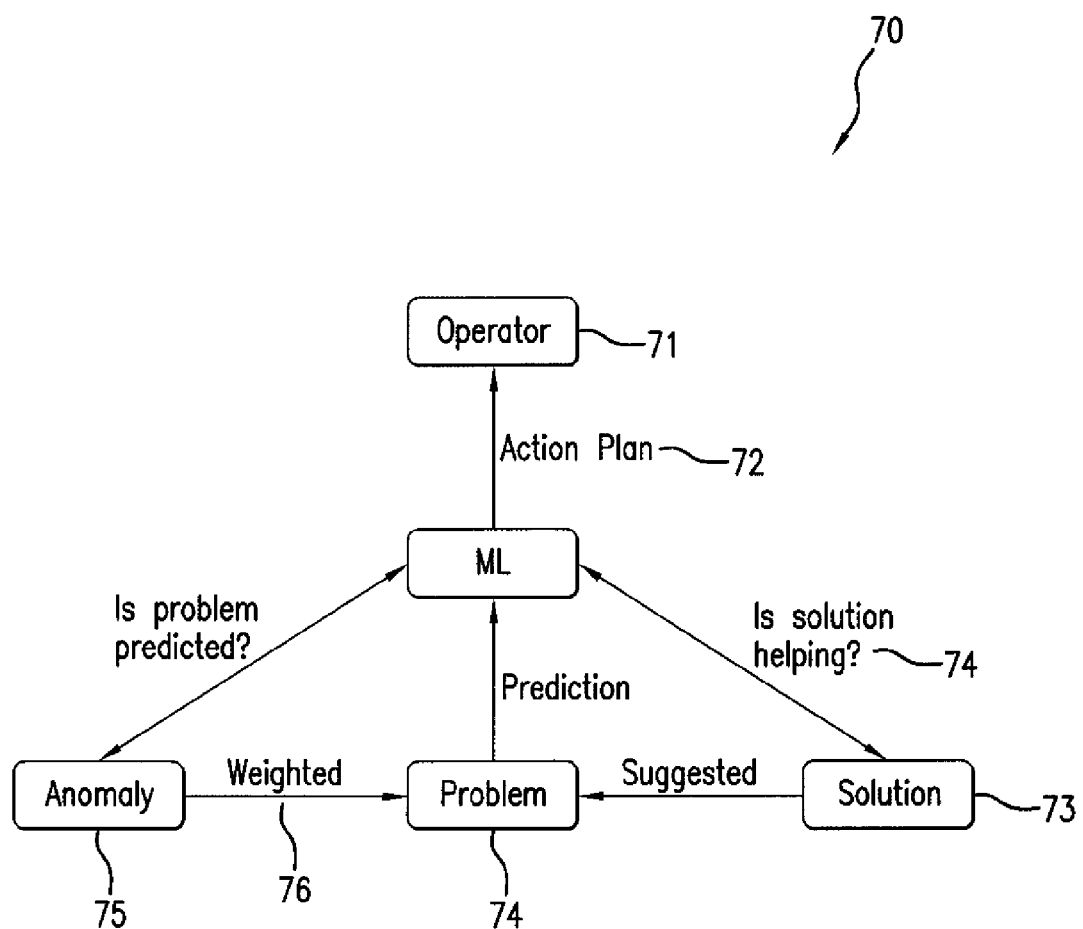
FIG. 7 depicts an expert system for one particular embodiment which reveals the logic in which problems are predicted based on observed data, and action plans are proposed in response thereto. There it is shown that an anomaly is registered, which initiates determination of whether the event is predicted to be a problem based on the registered anomalies. The system performs an analysis for each solution to determine if the solution is helping, on one or more pre-selected contingencies.

Referring to FIG. 7, an exemplary system display protocol (70) is shown. There it is shown that an anomaly is registered, which initiates determination of whether the event is predicted to be a problem based on the registered anomalies. The operator (71) has the ability to filter observed anomalies by category, time and/or location. The operator can interact with the system by acknowledging potential problems and also monitoring the usefulness of any implemented action plan (72), discussed below. One or more solution(s) (73) can be suggested to alleviate the problem. The system performs a cost-benefit analysis for each solution to determine if the solution is helping (73). Cost benefit analysis can be determined based on one or more pre-selected contingencies. Based on the best solution, an action plan is proposed to an operator for implementation.

In various embodiments, the system predicts problems (74) based on observed anomalies (75). Furthermore, the accuracy of previously identified problems can be registered, i.e., the performance of past problem prediction, based on the observed anomalies and whether a problem actually existed. Future anomalies are weighted based on past results, to better identify problems going forward. Ranks (76) are assigned future anomalies based on previously identified correlations between previously observed anomalies and the presence or absence of a confirmed problem. In this regard machine learning is employed to improve problem prediction.

In other embodiments, the system provides solutions based on predicted problems. Furthermore, embodiments of the present application registers the effectiveness of previously implemented action plans in order to modify, if necessary, future action plans based on similarly observed anomalies and/or predicted problems. In this regard, machine learning catalogues prior network response to previously implemented action plans in order to optimize future action plans that can achieve the best response when applied by the operator to the electrical grid.

In the above discussion, problems identified, and the action plans can be implemented using any one of the cockpit control display embodiments described herein.

In one particular embodiment, when an anomaly is detected, the system stores the networks' present status, start time and end time. The system allows for status information to be updated manually or automatically. The present status can be either one of: "active," "closed" or "override". Furthermore, the operator has the capability to indicate whether the problem identified is valid, to indicate whether the suggested actions were actually implemented, and to indicate whether the problem was resolved via the suggested actions.

Based on the observed anomaly, the presence of a problem is determined. If a problem is detected, an action plan is generated based on the solution implemented. A new action plan can be generated each time a problem is detected. The system can display a description of the problem and the likelihood of the problem occurring, optionally based on a specified contingency. The system can also display and register one or more of a list of anomalies that contributed to the problem, a list of possible solutions to the problem and/or any of the contributing anomalies. A cost-benefit analysis can be per formed for each suggestion.

In some embodiments, the detection of a new anomaly can trigger another event. Solutions can be obtained by proactively supplementing the Action Plan with additional information from external sources.

Example 1

The powerflow simulator applications based on PVL—PVL itself, AutoWolf, QuickWolf—and as available, the DEW simulator are used to evaluate the impact of next feeder failures on transformer and section overloads using real-time loads from NetRMS. The PVL model assumes perfect networks as designed with no Banks Off, Open Mains, etc. QuickWolf and AutoWolf outputs a list of at risk Transformers and Sections ordered from highest overload for peak load to be expected that day, and for maximum load ever for that network. Manhattan Networks are running Wolf continuously for the NOW case and can drive the CAT with 20 minute updates. Brooklyn, Queens and Bronx networks are presently event driven.

The "MartaSim" or the currently used ODDS Machine Learning systems then prioritizes this ranking to provide a color coded rating of the likelihood of which feeders and components are the most at risk and susceptible to actually failing within the next 14 days. The Susceptibility inputs are:
1. Live NetRMS and FRA;
2. Live Load PocketWeight;
3. Live PQNode Events;
4. Static Composition Attributes;
5. Jeopardy database;
6. Hipot Index database; and
7. Outage history database;

The susceptibility output is the feeder rankings
In addition, other guidance is used for components and LPW:
1. Section rankings from a separate ranking system using support vector machines (SVMS);
2. Transformer rankings from a separate ranking system using support vector machines (SVMS); and
3. LPW variances from a live load pocket weight feed.

Figure 8:
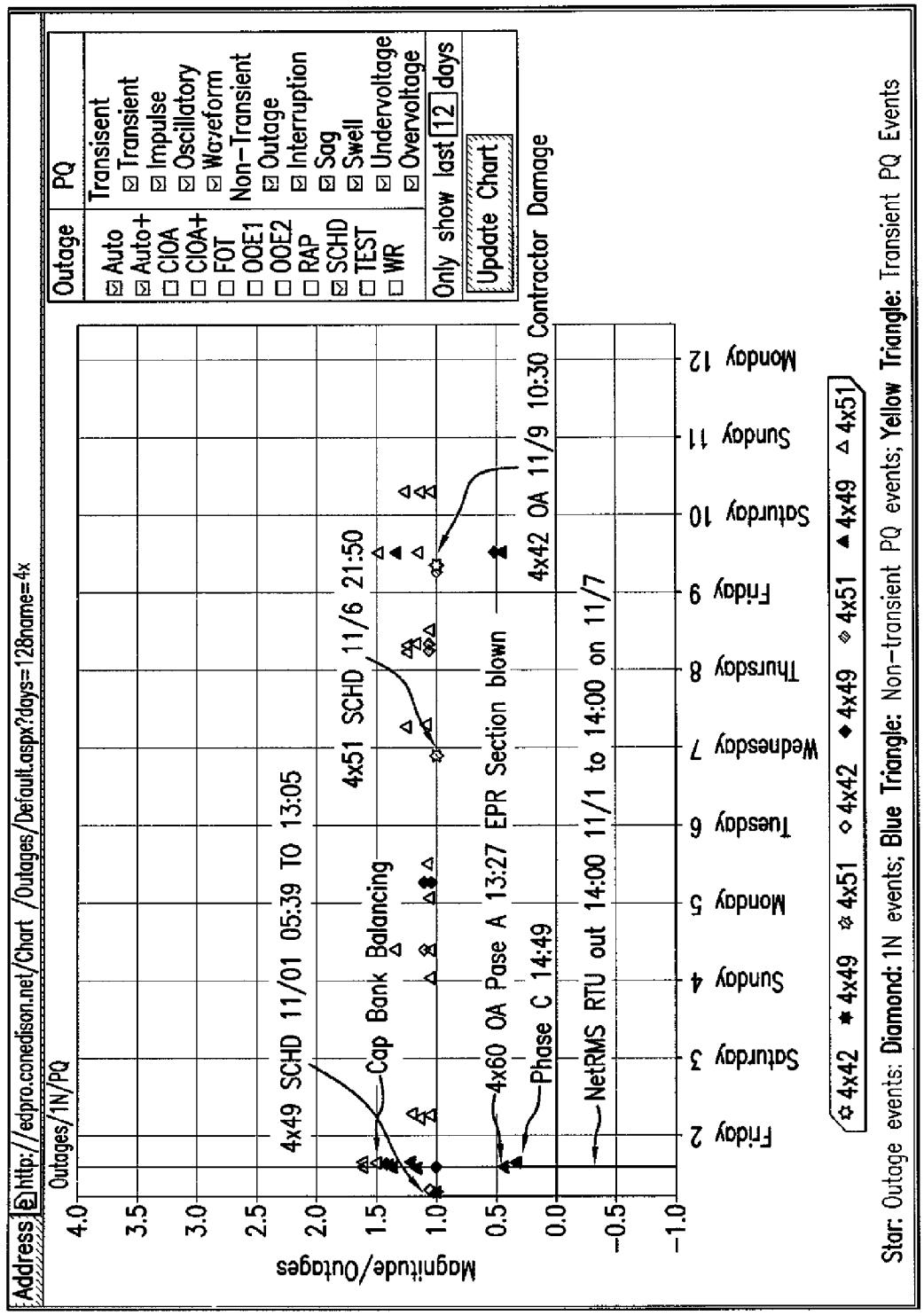
FIG. 8 depicts a non-limiting exemplary display of PQ Node Events and Outages, which is discussed in Example 1 of this application.

Electrical Risk is output to the Next Worse Contingency Analysis report where most at Risk Customer Susceptibility is evaluated using inputs:
a. Customer Complaints of flickering lights, dim lights, etc. coming into call centers;
b. Open Mains;
c. Banks Off and Transformers overloaded;
d. 4 KV problems;
e. High Tension Vault and Iso/Spot customers are given extra weight;

A List of the most at risk Feeders is forwarded to the Feeder Hotlist program to evaluate their cumulative Load Pocket Weight problems along their length. The Transformer Load Transfer Variance from the Transformers that are on the feeders that are out-of-service to their nearby pick-up Transformers is evaluated and tracked over Time using:
a. Load Transfer Variance
b. Feeder Hotlist Ranking
c. PQ Node Events and Outages (see FIG. 8)

Potentially problematic variances of Transformer Load Pockets and PQ Overvoltage events are forwarded to the CAT tool, and Transformers are ranked for those most needing load relief, cooling, and support from switch closings of their nearbys.

Example 2

Contingency Analysis Interface

An exemplary and non-limiting contingency analysis interface for the combined network and radial systems is provided. A description of each field in the Display together with drill-down or other selection options and color code conventions are included.

Template Field identification and Functionality Description
Primary Feeder Battle Field Contingency Button
Green No current or next contingency—In order to register the color green there must be confirmation that Contingency Analysis has initiated and completed.
Yellow No current contingency. Next contingency exists, also confirms that Contingency analysis has completed.
Red Current contingency, either overload or customer interruption exists.
Contingency Analysis Display Header
Field Description
Region Pull down menu to select region or entire system.
Network Pull down menu to select network area.
VDIS Puke point (e.g. mouse sensitive area on screen) to bring up Visual DIS.
TLV Poke point to bring up Transformer Variation Display.
SUS Poke Point to bring up Susceptibility display—The susceptibility display will provide feeder rankings based on Columbia's Machine Learning application.
Contingency Menu Poke point to bring up Contingency Analysis display—This is a menu driven navigation that will allow operators to access the Contingency Analysis display from other then the Primary battlefield view in the HUD. See attached template.
Application Menu Poke point to bring up Application Menu (High Level display) that is currently used in the control centers to navigate to key applications.
Test Case Link to run "What If" scenarios.
Now Out Link to run real time analysis (current cont level is displayed).
Now-Proj-Peak Select case to display.
HTV Tallies number of HTVs interrupted.
ATS Tallies number of ATS interrupted.
Auto Loop Tallies number of auto loops interrupted.
ISO Tallies number of ISOs interrupted.
Feeder Case Displays the Feeder or combination of feeders out of service for the given case.
VCAP Link to bring up Visual Contingency analysis Program.
Select View Select views for Network Only, Radial Only and All (Combines network and Radial views.
Column Description
Feeder Contingency Case
Station Station of origin—Drill down to SOCCS-X (substation SCADA display). Gray background—station RTU not responding—Same as DIS representation available from PI. Poke point opens SOCCS-X display of substation.

Network Network of origin—Color coded to show degree of network Jeopardy derived from the dynamic Jeopardy Monitor program-poke column for DIS. Color code will be developed with DE. Poke point opens VDIS display for entire network.

Feeder Feeders that comprise case—Poke point for battlefield display. No color. Poke point opens HUD single feeder view.

Reason Type of feeder outage. Generated by FMS. No color code.

Status Current Operating step in FMS with Drill down to FMS. No color code. Poke point opens FMS CAP for the feeder.

Est Rest Estimated restoration of the feeder from FMS.

Radial

Feeder Impacted feeders.

Reason Same as above.

Status Same as above.

Equipment Id Impacted equipment—Turns red if now case exceeds emergency rating or customers have been interrupted, turns yellow if next contingency exceeds emergency rating or interrupts customers. Does not calculate number of customers interrupted.

Loop Sub-categories of Radial-Fields identified under Radial apply to each sub-set.

High Tension Vaults

Feeder List all feeders that supply high-tension customers affected by contingency.

Reason Derived from FMS. Show in service or out of service. If out of service, what was cause?

Status In service or current operating step as reflected in FMS. Poke point opens banks-off entry if high tension vault is live end capped.

Equipment ID Indicate high tension vault number. Poke point opens high tension diagram for customer (metaphase drawing).

Next Identifies feeder that causes next contingency.

Color Code Turns Red if overload or interruption exists in real time. Turns Yellow if overload or interruption occurs on next contingencies.

Isolated/Multibank Networks

Feeder Lists all feeders that supply Isolated/Multi-bank Network.

Reason Derived from FMS. Show in service or out of service. If out of service, what was cause?

Status In service or current operating step as reflected in FMS. Poke point opens banks-off entry if transformer is blocked open or live end capped.

Equipment ID Shows all vaults that comprise the isolated or multi-bank network. Changes color to yellow for interruption that would occur on next contingency turns red if Isolated Network is currently out of service or on street ties only. Feeders out of service or not available are "right justified". Poke point opens Net-RMS display w/nearby.

Customer Indicates name of customer or facility. Poke point opens EMOPSYS entry for customer.

Location Address of customer or facility. Poke point opens Net-DVD M&S display for location.

Street feed Indicates if multi-bank or isolated network has secondary ties. Y=yes, N=no.

Next Worse Identifies feeder that causes next contingency.

Demand Poke point displays demand information from Load Aggregator.

Color Code Turns Red if overload or interruption exists in real time. Turns Yellow if overload or interruption occurs on next contingencies.

Transformer Overloads

Select Case Select Now, Projected or Peak case. Selected case turns gray.

Feeder Impacted feeder(s) not currently out of service

Equipment Id Impacted transformer—Turns red if current overload exceeds transformer contingency rating. Poke point opens Net-RMS entry w/nearbys.

Specification Transformer contingency rating.

Current Transformer current load (calculated by model) compared to spec. See color code Poke point opens TOMS entry for the transformer.

Next Transformer load compared to Spec on next contingency. See color code. Poke point opens Columbia Transformer Load Variance (TLV) application.

Color code:
Red Exceeds contingency rating
Grey Indicates transformer Load Variance Drill down to TLV display which is currently running on a blade server. A suggested display of TLV is attached below in Table 1

Contributing Fdr Lists the trouble feeder that is the major contributor to the overload now or next.

Loss Of Feeders, that if lost will cause the next worse contingency. Color code indicates degree of Susceptibility.

Susceptibility color code.
Red High susceptibility.
Yellow Medium Susceptibility.
Green Low Susceptibility.

Poke point opens Columbia machine learning real-time susceptibility ranking.

Banks Off Transformers now off which contribute to or causes a next contingency-color code indicates three possible transformer conditions:
Yellow Xfmr live end capped.
Pink Network Protector Open.
Blue RMS not reporting.

Poke Vault Number for Banks Off Entry

Primary Cable Overloads

Select Case Select, now, projected or peak. Gray indicates selected case

Feeder Impacted feeders not currently out of service. Poke point opens "trouble nearby" report for the feeder.

From-To identifies the impacted section of cable through VACAP which provides navigation point to visual display of over load as seen on the single feeder view in the HUD. Cursor over VCAP on Contingency Analysis display presents Manhole to Manhole identification. VCAP turns red if emergency rating is exceeded. Poke point opens VCAP single feeder view for primary overloads.

Specification Cable emergency rating.

Current Displays base case feeder load as percentage of rating. Poke point opens feeder trace with "one feeder comparison" including normal and emergency ratings.

Next Displays feeder load on "next first" based on wolf.

Contributing Fdr Lists the trouble feeder that is the major contributor to the overload now or next.

Loss of Feeders, that if lost will cause the next worse contingency. Color code indicates degree of susceptibility.

Susceptibility color code.
  Red High susceptibility.
  Yellow Medium Susceptibility.
  Green Low Susceptibility.
  Poke point opens Columbia real-time susceptibility ranking.
Banks off Transformers now off which contribute to or causes a next contingency-color code indicates three possible transformer conditions:
  Yellow Xfmr live end capped.
  Pink Network Protector Open.
  Blue RMS not reporting.
  Poke vault number for Banks off entry.
Secondary Overloads
Select Case Select now, projected or peak case, selected case turns gray.
Equipment ID identifies the impacted secondary bus through VCAP which provides navigation point to VCAP secondary visualization. VCAP turns red if emergency rating is exceeded. This section will display secondary overloads now and next when the secondary has been modeled.
Poke point opens VCAP secondary visualization.
Specification Minimum contingency voltage.
Current Base case voltage according to wolf, turns yellow if voltage limit is violated on next event. Red if violated on base case.
Next Voltage on next event, according to wolf, turns red if voltage limit is violated.
Loss Of Next worse feeder according to wolf.
Contributing Fdr Lists the trouble feeder that is the major contributor to the overload now or next.
Banks Off Banks off in the area are listed.
NTI Customers Number of customers potentially interrupted per NTI. Poke point opens NTI display for network.

TABLE 1

A suggested Transformer Load Variation Display Compared to Spec. on Next Contingency

| | | Transformer Load Variation | | | |
|---|---|---|---|---|---|
| Network | Feeder | Transformer | Expected | Actual | Difference |
| W. Plains | 8W81 | V380 | 100 | 200 | 100 |
| | | V383 | 200 | 300 | 100 |
| | | V392 | 300 | 100 | −200 |
| Poke for Contingency Case O | | | | | |
| W. Plains | 8W82 | V381 | 100 | 300 | 200 |
| | | V441 | 300 | 500 | 200 |
| | | V442 | 100 | 100 | '0 |
| Poke for Contingency O | | | | | |
| Contingency Menu O | | | | | |
| Application Menu O | | | | | |

Contingency Analysis Menu

Contingency Display-
Enter Network Name__
Susceptibility Display-
Enter Network Name
Transformer Load Variation
Enter Network Name
Net-Reports
Enter Network Name
Application Menu O (Poke)

TABLE 2

Sample table of anomaly definitions for Rules Engine

| ID | Category | Anomaly Name | Criteria | Comments |
|---|---|---|---|---|
| 1 | Data | Auto Data Quality Tests | ??? | |
| 2 | Data | RMS Reporting Rate | <95% | |
| 3 | Data | RMS Reporting Rate (Severe) | <85% | |
| 4 | Data | RMS Reporting Rate (Critical) | <75% | |
| 5 | ECS | MHX | Event | |
| 6 | ECS | MHF | Event | |
| 7 | ECS | SMH | Event | |
| 8 | ECS | MHO | Event | |
| 9 | ECS | FRQ | Event | |
| 10 | ECS | SO | Event | |
| 11 | ECS | SOP | Event | |
| 12 | ECS | SOB | Event | |
| 13 | ECS | NL | Event | |
| 14 | ECS | NLA | Event | |
| 15 | ECS | LV | Event | |
| 16 | ECS | FLT | Event | |
| 17 | ECS | HotZones | Three or more calls from the same address in the past 2 years with the following trouble types: | |
| 18 | ECS | CAIDI | ??? | |
| 19 | ECS | SAIFI | ??? | |
| 61 | ECS | High Voltage | Event | |
| 20 | Feeder | Outage | Event (Auto or CIOA) | |
| 21 | Feeder | Overload | Over normal rating | |
| 22 | Feeder | Overload (Severe) | Over contingency rating | |
| 23 | Feeder | High Bus Voltage | ??? | QUE 4260-14 |
| 24 | Feeder | Low Bus Voltage | ??? | QUE 4260-14 |
| 58 | Feeder | Scheduled Outage | Event (Not Auto and Not CIOA) | |
| 65 | Feeder | ABF | Event (in FMS) | |
| 67 | Feeder | Susceptibility | Feeder susceptibility falls in first bucket | |
| 25 | Major Customer | Contingency | ??? | |
| 26 | Major Customer | Outage | ??? | |
| 27 | Model | Transformer Load Variance | Variance between model and actual load | |
| 28 | Model | Overload Transformer | Exceeds rating on normal | |
| 29 | Model | Overloaded Primary Section | Exceeds rating on normal | |
| 31 | Network | Open Main | Event | |

TABLE 2-continued

Sample table of anomaly definitions for Rules Engine

| ID | Category | Anomaly Name | Criteria | Comments |
|---|---|---|---|---|
| 32 | Network | New Dfault | Event | |
| 33 | Network | New Shunt | Event | |
| 59 | Network | PQ Node Event | Event ??? | |
| 66 | Network | Section condemned in place | Event (in Open Mains table) | |
| 34 | Transformer | Over Temperature | Top Oil Temp >90 degrees C. | EO 4095 |
| 35 | Transformer | Over Temperature (Severe) | Top Oil Temp >110 degrees C. | EO 4095 |
| 36 | Transformer | Over Temperature (Critical) | Top Oil Temp >125 degrees C | EO 4095 |
| 37 | Transformer | Over Temperature Duration | ??? | |
| 38 | Transformer | Over Voltage | Voltage >129 | PSC: 108-126 V allowed at meter on second conting |
| 39 | Transformer | Under Voltage | Voltage <108 | PSC: 108-126 V allowed at meter on second conting |
| 40 | Transformer | Over Voltage Duration | ??? | |
| 41 | Transformer | Under Voltage Duration | ??? | |
| 42 | Transformer | Overload | Over normal rating | |
| 43 | Transformer | Overload (Severe) | Over first conting rating | |
| 44 | Transformer | Overload (Critical) | Over second conting rating | |
| 45 | Transformer | Overload Duration | ??? | |
| 46 | Transformer | Low Pressure | ??? | |
| 47 | Transformer | Water Alarm | Event | |
| 48 | Transformer | Fuse | Status = "Fuse" or (any phase at 0 load and another phase >10) | |
| 49 | Transformer | Phase Imbalance | Any 2 phases >50 p.u. apart | |
| 50 | Transformer | Bank Off | Event | |
| 51 | Transformer | Open Switch | Event | |
| 52 | Transformer | Load Shift Variance | ??? | |
| 53 | Transformer | Uneven Load Distribution | Target <20 but one of nearbies with NBF >10 has load >50 | |
| 54 | Transformer | Missing | Event | |
| 55 | Transformer | Old/Not Reporting | Scan time >1 hour old | |
| 56 | Transformer | Root Square | Network Protector was closed prior to feeder outage but remained open after feeder restoration (12 hour delay) | |
| 57 | Transformer | Root Square 2 | Network Protector was closed prior to feeder outage but became a blown fuse after feeder restoration (12 hour delay) | |
| 60 | Transformer | High Pressure | ??? | |
| 62 | Transformer | ABF | ??? | |
| 63 | Transformer | Blocked Open | Event (in Banks Off table) | |
| 64 | Transformer | CFR | Event (in Banks Off table) | |
| 30 | Weather | Temperature Variable | >86 Degrees | |
| 68 | Weather | Sudden Temperature change | ??? | |
| 69 | Weather | Snow Storm/Icy roads | ??? | |
| 70 | Weather | Severe Rain | ??? | |
| 71 | Weather | Severe Wind | ??? | |
| 72 | Weather | Heat Wave | 3 or more days over 90 degrees | |
| 73 | Weather | Hot day | Temperature over 90 degrees | |

Figure 9:
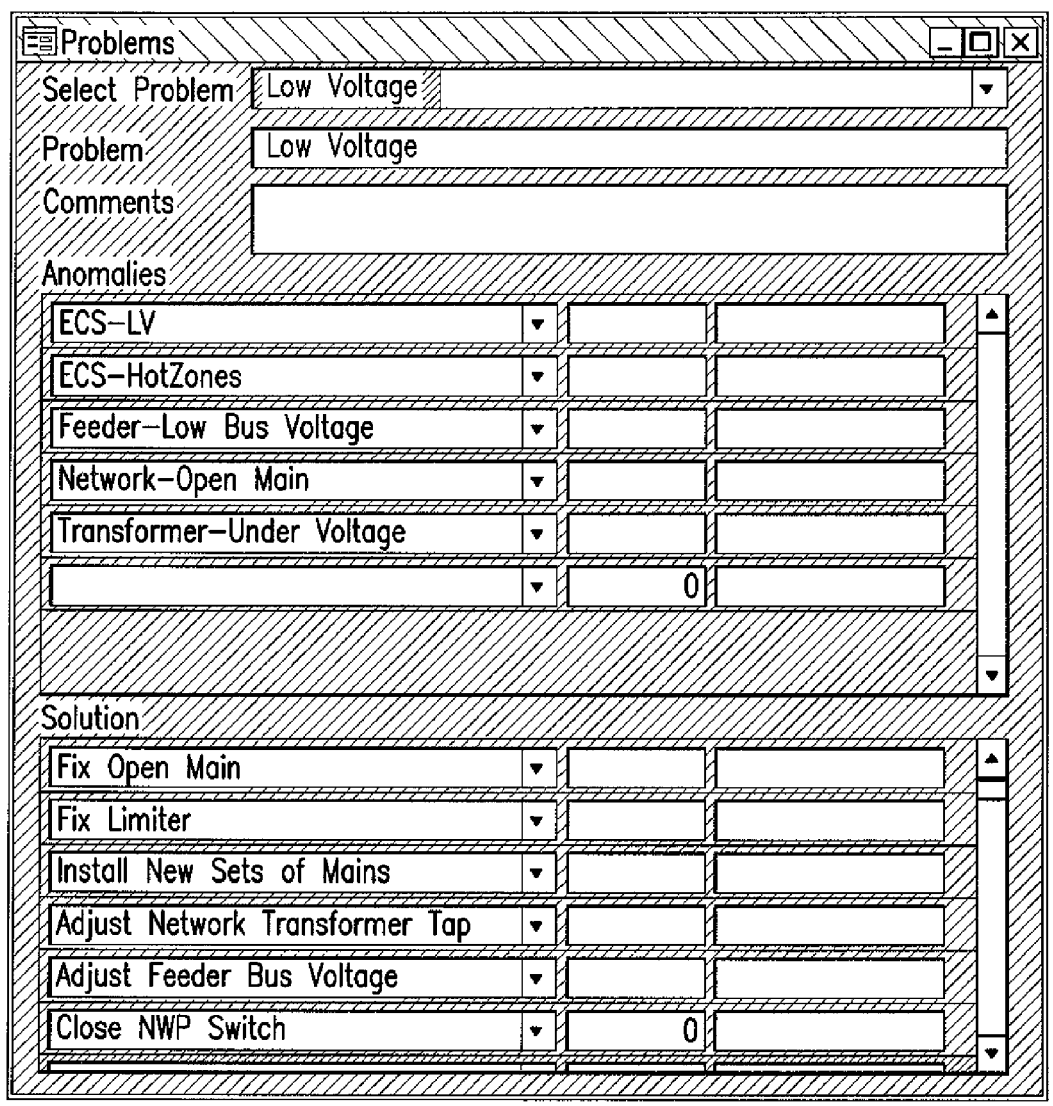
FIG. 9 depicts a sample form in which shows the relationships of anomalies to problems and solutions.

A sample form in which operators can link anomalies to problems and solutions is shown in FIG. 9. This interface can be used for defining the Rules Engine.

It will be understood that the foregoing is only illustrative of the principles of the disclosed subject matter, and that various modifications can be made by those skilled in the art without departing from the scope and spirit thereof. For example the foregoing may be applied to energy and other utility control centers (e.g. nuclear control centers) and also to mass transit energy control centers.

The invention claimed is:

1. An integrated decision support control center system to permit an end user to monitor the status of at least a portion of a utility network, comprising:
    one or more processors, each having respective communication interfaces to receive data from said utility network, said data comprising real time utility network data;
    one or more software applications, operatively coupled to and at least partially controlling said one or more processors, to:
        process said real time utility network data and determine whether a change in condition in said at least portion of said utility network has occurred,
        determine if said change in condition is an anomaly, and predict one or more problems based on said anomaly by assigning a weight to said anomaly based on previously identified correlations between previously observed anomalies and the presence or absence of a confirmed problem; and
    a display, coupled to said one or more processors, for visually presenting said a depiction of at least said portion of said utility network, including any changes in condition thereof, in an integrated manner.

2. The decision support control center system of claim 1, wherein said utility network comprises an electrical grid, and said real time utility network data comprises real time status overview data for said portion of said electrical grid.

3. The decision support control center system of claim 2, wherein said electrical grid further comprises one or more electrical feeders, and said real time utility network data further comprises electrical feeder status data.

4. The decision support control center system of claim 2, wherein said electrical grid further comprises one or more electrical substations, and wherein said real time utility network data further comprises electrical substation status data.

5. The decision support control center system of claim 3, wherein said electrical feeder status data includes status data for a plurality of electrical feeders, and said display further permits the visual monitoring of said plurality of electrical feeders.

6. The decision support control center of claim 2, further comprising a data storage device coupled to said one or more processors, storing topographical display data for said portion of said electrical grid, and wherein said display is adapted to visually present a topographical display of said portion of said electrical grid from said topographical display data.

7. The decision support control center system of claim 1, further comprising a decision support interface, coupled to said one or more processors, for permitting said end user to communicate with said system.

8. The decision support control center system of claim 1, wherein said one or more software applications further comprises an alarm manager for determining when a determined change in condition is an alarm condition and generating said alarm condition, and wherein said display further permits the visual presentation of said alarm condition.

9. The decision support control center system of claim 3, further comprising a data storage device, coupled to said one or more processors, storing susceptibility to failure data for said one or more electrical feeders, and said one or more software applications further comprises a susceptibility to failure routine for analyzing when a determined change in condition can lead to a failure of one or more of said electrical feeders by comparing said real time utility network data to said stored susceptibility to failure data.

10. The decision support control center system of claim 3, further comprising a data storage device, coupled to said one or more processors, storing contingency analysis data, and said one or more software applications further comprises a contingency analysis routine for analyzing when a determined change in condition can lead to one or more contingencies.

11. A method for operating an integrated decision support control center system to permit an end user to monitor the status of at least a portion of a utility network, comprising:
receiving real time utility network data from said utility network;
determining, from said received real time utility network data, whether a change in condition in said at least portion of said utility network has occurred;
determining if said change in condition is an anomaly;
predicting one or more problems based on said anomaly by assigning a weight to said anomaly based on previously identified correlations between previously observed anomalies and the presence or absence of a confirmed problem; and
displaying a depiction of at least said portion of said utility network, including any determined changes in condition thereof, in an integrated manner.

12. The decision support control center method of claim 11, wherein said utility network comprises at least a portion of an electrical grid, and said real time utility network data comprises real time status overview data for said portion of said electrical grid.

13. The decision support control center method of claim 12, wherein said real time utility network data further comprises electrical feeder status data, and said determining comprises determining a change in condition of one or more electrical feeders.

14. The decision support control center method of claim 12, wherein said real time utility network data further comprises electrical substation status data, and said determining comprises determining a change in condition of one or more electrical substations.

15. The decision support control center method of claim 12, wherein said displaying further comprises visually displaying a topographical display of said portion of said electrical grid.

16. The decision support control center method of claim 12, wherein said one or more software applications further comprises an alarm manager for determining when a determined change in condition is an alarm condition and generating said alarm condition, and wherein said display further permits the visual presentation of said alarm condition.

17. The decision support control center method of claim 12, further comprising analyzing when a determined change in condition can lead to a failure of one or more of said electrical feeders by comparing said real time utility network data to susceptibility to failure data.

18. The decision support control center method of claim 12, further comprising analyzing when a determined change in condition can lead to one or more contingencies.

19. An integrated decision support control center system to permit an end user to monitor the status of at least a portion of a utility network, comprising:
communication interface means for receiving data from said utility network, said data comprising real time utility network data;
data processing means, coupled to said communication interface means to:
process said real time utility network data and determine whether a change in condition in said at least portion of said utility network has occurred
determine if said change in condition is an anomaly, and
predict one or more problems based on said anomaly by assigning a weight to said anomaly based on previously identified correlations between previously observed anomalies and the presence or absence of a confirmed problem; and
display means, coupled to said data processing means, for visually presenting said a depiction of at least said portion of said utility network, including any changes in condition thereof, in an integrated manner.

20. The decision support control center system of claim 19, wherein said utility network comprises an electrical grid, and said real time utility network data comprises real time status overview data for said portion of said electrical grid.

21. The decision support control center system of claim 1, wherein said one or more problems are ranked according to a likelihood that said problem one or more problems occurring.

22. The decision support control center system of claim 21, wherein said one or more problems are ranked based on contingency analysis.

23. The decision support control center system of claim 1, wherein said one or more software applications are further configured to generate one or more proposed actions in response to said one or more problems, and wherein said one or more processors are further configured to receive, from an operator, an indication of which proposed actions, if any, were undertaken and an indication corresponding outcomes.

24. The decision support control center system of claim 1, wherein said one or more proposed actions are generated based on prior received indications of actions taken and corresponding outcomes.

25. The method of claim 11, further comprising:
obtaining real-time contingency analysis information from a plurality of existing external sources;
integrally combining the real-time contingency analysis information obtained from each of the plurality of external sources into a single application and prioritizing the real-time contingency analysis information in a predetermined order;
dynamically updating, the real-time contingency analysis information obtained from each of the plurality of external sources and the prioritization of the real-time contingency analysis information based on status information; and
displaying the real-time contingency analysis information to a user via a graphical user interface.

* * * * *